United States Patent
Kol et al.

(10) Patent No.: US 12,299,421 B2
(45) Date of Patent: May 13, 2025

(54) SYSTEM INTEGRATING A MOBILE DEVICE APPLICATION CREATION, EDITING AND DISTRIBUTION SYSTEM WITH A WEBSITE DESIGN SYSTEM

(71) Applicant: Wix.com Ltd., Tel Aviv (IL)

(72) Inventors: Tal Shalom Kol, Hod Hasharon (IL); Noam Cocos, Tel Aviv (IL); Noam Almog, Rehovot (IL); Reuven J. Sherwin, Ra'anana (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 18/513,687

(22) Filed: Nov. 20, 2023

(65) Prior Publication Data

US 2024/0086159 A1   Mar. 14, 2024

Related U.S. Application Data

(63) Continuation of application No. 17/013,601, filed on Sep. 6, 2020, now Pat. No. 11,853,728, which is a
(Continued)

(51) Int. Cl.
*G06F 8/36*   (2018.01)
*G06F 3/0482*   (2013.01)
(Continued)

(52) U.S. Cl.
CPC ............ *G06F 8/36* (2013.01); *G06F 3/0482* (2013.01); *G06F 16/9577* (2019.01); *G06F 16/958* (2019.01); *G06F 16/986* (2019.01); *G06F 40/106* (2020.01); *G06F 40/143* (2020.01); *G06F 40/151* (2020.01); *G06F 40/154* (2020.01); *G06F 40/197* (2020.01); *G06F 8/20* (2013.01); *G06F 8/40* (2013.01)

(58) Field of Classification Search
CPC ..... G06F 8/36; G06F 8/20; G06F 8/40; G06F 16/958; G06F 16/986; G06F 16/9577; G06F 40/143; G06F 40/197; G06F 40/106; G06F 40/151; G06F 40/154; G06F 3/0482
See application file for complete search history.

(56) References Cited

U.S. PATENT DOCUMENTS 5,901,246 A * 5/1999 Hoffberg ............ G11B 27/107
                                                    386/E5.043
7,216,298 B1 * 5/2007 Ballard ............... G06F 16/9577
                                                    715/744
(Continued)

*Primary Examiner* — Shahid K Khan
(74) *Attorney, Agent, or Firm* — Heidi M. Brun

(57) ABSTRACT

A system includes an application generating website building system (AGWBS) for converting a website to an application (app) which operates on a mobile device. The AGWBS includes at least one database storing at least one layout option for the app and BI (business information) for the website, where the BI includes at least use of settings and features by a designer of the website and of apps of the AGWBS from previous editing sessions and an app-editor to determine an editing mode for a designer of the app according to at least the use of settings and features and to provide at least one layout option from the at least one database for the app according to the editing mode and to receive modification to a designer selected layout.

18 Claims, 24 Drawing Sheets

Related U.S. Application Data continuation of application No. 15/224,616, filed on Jul. 31, 2016, now Pat. No. 10,769,231.

(60) Provisional application No. 62/198,725, filed on Jul. 30, 2015.

(51) Int. Cl.
| | |
|---|---|
| *G06F 16/957* | (2019.01) |
| *G06F 16/958* | (2019.01) |
| *G06F 40/106* | (2020.01) |
| *G06F 40/143* | (2020.01) |
| *G06F 40/151* | (2020.01) |
| *G06F 40/154* | (2020.01) |
| *G06F 40/197* | (2020.01) |
| G06F 8/20 | (2018.01) |
| G06F 8/40 | (2018.01) |

(56) References Cited

U.S. PATENT DOCUMENTS

| | | | |
|---|---|---|---|
| 8,261,231 B1 * | 9/2012 | Hirsch | G06F 8/36 |
| | | | 717/121 |
| 8,949,370 B1 * | 2/2015 | Wu | H04W 4/60 |
| | | | 709/217 |
| 10,083,156 B2 * | 9/2018 | Burckart | G06F 40/143 |
| 2004/0172409 A1 * | 9/2004 | James | G06F 18/22 |
| 2009/0265611 A1 * | 10/2009 | Sengamedu | G06F 16/9577 |
| | | | 715/234 |
| 2013/0124968 A1 * | 5/2013 | Dontcheva | G06F 40/103 |
| | | | 715/234 |

* cited by examiner

SYSTEM INTEGRATING A MOBILE DEVICE APPLICATION CREATION, EDITING AND DISTRIBUTION SYSTEM WITH A WEBSITE DESIGN SYSTEM

CROSS REFERENCE TO RELATED APPLICATIONS

This application is a Continuation Application of U.S. patent application Ser. No. 17/013,601 filed Sep. 6, 2020 which is a Continuation Application of U.S. patent application Ser. No. 15/224,616 filed Jul. 31, 2016 which claims priority and benefit from U.S. Provisional Patent Application No. 62/198,725, filed Jul. 30, 2015 all of which are incorporated herein by reference.

FIELD OF THE INVENTION

The present invention relates to website building systems generally and to website building systems allowing creation of mobile device applications in particular.

BACKGROUND OF THE INVENTION

Website building systems (WBS) have become very popular and allow website builders to build professional looking and functioning websites. Many of these systems provide both the novice and experienced user with ways of building websites from scratch.

A website building system may be a standalone system or may be embedded inside a larger editing system. It may be operated on-line, i.e. websites may be edited and stored on a server, off-line or partially on-line where the web sites are being edited locally and uploaded later to a central server.

Websites are typically made up of one or more visually designed applications. For example, a single website may consist of a blog, an e-shop and a support forum. Each such application, typically consisting of pages, contains components.

Components may be shape components, picture components, text components, single-and multi-page containers containing mini-pages, etc. Components may be contentless such as a star-shape which does not have any internal content (through it has color, size, position and some other parameters) or may have internal content, such as a text paragraph component, whose internal content includes the displayed text, as well as font, formatting and layout information. This content may, of course, vary from one instance of the text paragraph component to another.

Components are typically arranged in a hierarchy of containers, (each of which may be a single page or multi-page) inside the page containing atomic components. A multi-page container may display multiple mini-pages. Pages may also include third party applications (TPAs)—components provided by a (non WBS vendor) third party. Pages may also use templates—full website templates, general page templates or component templates. Specific cases for templates include the use of a master page containing components replicated in some or all other regular pages, and the use of a page header and/or footer (which are repeated on some or all of the pages). The arrangement of components inside a page is called a layout.

A WBS is typically offered by a WBS vendor and is used by users, known as designers, who design the websites using the WBS. The created websites themselves are hosted on the WBS and are accessed and used by end-users.

The same WBS may offer a set of different solutions for different markets. Such solutions are called vertical solutions, also known as "verticals", each aimed at different markets, such as photography, music, e-commerce, generic small and medium-sized business (SMBs), loyalty club, client support, messaging etc. Such vertical solutions may typically include customizable templates for the whole website (or for specific pages, page sections or components) as noted above. The system may also support sub-verticals, i.e. specific sub-classes of main verticals. For example, photography vertical may include sub-verticals specializing in fashion photography, food photography, wedding photography and so on. A vertical solution may include vertical specialized elements (VSEs) which are elements that are embedded into the vertical solution in addition to the regular components and TPA's provided by the WBS. Such VSEs may, for example, implement display functionality, underlying business logic, communication etc. Such VSEs may also include, for example, vertical specific code inside the WBS client code, which is the part of the WBS that runs on the user's client machine, which is activated through hooks available to the components, client-side pre-installed native code elements, such as those supported by the ActiveX technology of Microsoft Corp., or any other browser extension technologies. Moreover, some server-side logic may be implemented by the WBS in order to support functionality of a specific vertical application. This may include logic implemented on the WBS itself or on $3^{rd}$ party servers.

SUMMARY OF THE PRESENT INVENTION

There is provided, in accordance with a preferred embodiment of the present invention, an application generating website building system (AGWBS), implementable on a computing device, for converting a website to an application which operates on a mobile device. The system includes a website building system (WBS), a database, an application generator repository and an application generator. The WBS enables a user to build a website and also hosts the website. The database stores website data, which comprises at least a structure of the website. The application generator repository stores at least a plurality of per-vertical base apps, where each per-vertical base app is a template app for one type of business. The application generator determines a type of business for the website, generates an initial extended application content file (XACF) at least from an associated per-vertical base app for the type of business, analyzes the structure of the website to generate a graph of elements of the website and uses the graph to modify the associated per-vertical base app into an XACF defining the mobile application.

Further, in accordance with a preferred embodiment of the present invention, the structure of the website includes at least WBS attributes and components.

Moreover, in accordance with a preferred embodiment of the present invention, the website data includes metadata about the website, business intelligence (BI) collected on the website and business information of the website.

Moreover, in accordance with a preferred embodiment of the present invention, the application generator analyzes the metadata and modifies the XACF according to the analysis.

Moreover, in accordance with a preferred embodiment of the present invention, the business information includes at least one of editing history of the website by designer and WBS usage information.

Further, in accordance with a preferred embodiment of the present invention, the metadata includes at least one of:

attributes and hints including palettes, style guides, vertical type information and sub vertical type information.

Further, in accordance with a preferred embodiment of the present invention, the application generator further includes a site usage analyzer to analyze the BI.

Furthermore, in accordance with a preferred embodiment of the present invention, the application generator further includes an app editor to edit the XACF.

Further, in accordance with a preferred embodiment of the present invention, the application generator further includes a complex component convertor to identify components in the structure of the website, to identify relationships between the components and to automatically create corresponding structures for the application.

Further, in accordance with a preferred embodiment of the present invention, the application generator further includes a backend elements handler to connect to a website operational database (ODB) and to use operational information stored in the ODB to modify the XACF.

Further, in accordance with a preferred embodiment of the present invention, the application generator further includes a color and themes setter to automatically assign colors to components and screens of the application according to pre-defined aesthetic rules.

Moreover, in accordance with a preferred embodiment of the present invention, the color and themes setter further includes a brand determiner to extract a set of brand colors from the web site and to set an associated color theme for the brand colors, a color assigner to assign multiple colors within the theme to a plurality of user interface elements of the application, and a background designer to create a background to the plurality of user interface elements within the theme.

Further, in accordance with a preferred embodiment of the present invention, the color assigner generates a plurality of color adjacency graphs (CAG) and the AGWBS also includes a CAG analyzer to analyze the graphs.

Further, in accordance with a preferred embodiment of the present invention, the application generator also includes a main screen determiner to select a subset of screens of the application as main screens.

Further, in accordance with a preferred embodiment of the present invention, the AGWBS also includes a screen preview creator to render all screens or only the main screens of the application.

Furthermore, in accordance with a preferred embodiment of the present invention, the screen preview creator uses a client side rendering framework to render the user interface elements.

Moreover, in accordance with a preferred embodiment of the present invention, the client side rendering framework is at least one of: Scalable Vector Graphics (SVG), WebGL or HTML5 Canvas.

Further, in accordance with a preferred embodiment of the present invention, the screen preview creator also includes a field content determiner (FCD) to provide data for fields of the user interface elements.

Moreover, in accordance with a preferred embodiment of the present invention, the AGWBS also include a mobile visualizer app (v-app) to provide a preview of user interface elements of the application on a mobile device.

Moreover, in accordance with a preferred embodiment of the present invention, the v-app adds a watermark to the application to indicate that it is not a standard application.

Moreover, in accordance with a preferred embodiment of the present invention, the AGWBS includes a mobile WBS gateway app (w-app) to provide a user interface to display a plurality of websites built by the WBS and to select one of the websites as input for the application generator.

Further, in accordance with a preferred embodiment of the present invention, the AGWBS also include a mobile multi app (m-app) to execute a plurality of sub apps (s-apps), where each the s-app include the XACF for a different website.

Further, in accordance with a preferred embodiment of the present invention, the m-app is operative for s-apps of a single type of business.

Further, in accordance with a preferred embodiment of the present invention, the m-app also includes a localized app store.

Moreover, in accordance with a preferred embodiment of the present invention, the m-app also communicates with a recommender engine to recommend the s-apps.

Moreover, in accordance with a preferred embodiment of the present invention, the AGWBS also includes an s-app installer to install a selected one of the plurality of s-apps on the mobile device, and a trigger to activate the installer is a location detected by the mobile device, where the location is associated with the s-app to be installed.

Moreover, in accordance with a preferred embodiment of the present invention, the location is detected by one of satellite-based positioning system, Wifi, Beacon or inertial navigation.

Moreover, in accordance with a preferred embodiment of the present invention, the system also includes a common app engine (CAE) to execute the XACF.

Furthermore, in accordance with a preferred embodiment of the present invention, the AGWBS also communicates with a plurality of external preview servers located on the cloud to preview the application.

Moreover, in accordance with a preferred embodiment of the present invention, a server adapted CAE cloud server of the preview servers includes a server-adapted CAE directly executable on top of its server operating system.

Moreover, in accordance with a preferred embodiment of the present invention, the server adapted CAE cloud server includes a simulation server to concurrently execute a plurality of XACFs.

There is also provided, in accordance with a preferred embodiment of the present invention, a method for converting a website to an application which operates on a mobile device. The method includes a WBS enabling a user to build a website, the WBS also hosting the website, storing website data, the website data including at least a structure of the website, storing at least a plurality of per-vertical base apps, wherein each per-vertical base app is a template app for one type of business, determining a type of business for the website, generating an initial extended application content file (XACF) at least from an associated per-vertical base app for the type of business, analyzing the structure of the website to generate a graph of elements of the website and to use the graph and modifying the associated per-vertical base app into an XACF defining the mobile application.

Moreover, in accordance with a preferred embodiment of the present invention, the method also includes analyzing the metadata and modifying the XACF according to the analysis.

Further, in accordance with a preferred embodiment of the present invention, the method also includes analyzing the BI or editing the XACF.

Still further, in accordance with a preferred embodiment of the present invention, the method also includes identifying complex components in the structure of the website, identifying relationships between the components and automatically creating corresponding structures for the application.

Additionally, in accordance with a preferred embodiment of the present invention, the method also includes connecting to a website operational database (ODB) and using operational information stored in the ODB to modify the XACF.

Moreover, in accordance with a preferred embodiment of the present invention, the method also includes automatically assigning colors to components and screens of the application according to pre-defined aesthetic rules.

Further, in accordance with a preferred embodiment of the present invention, the method also includes extracting a set of brand colors from the website, setting an associated color theme for the brand colors, assigning multiple colors within the theme to a plurality of user interface elements of the application, and creating a background to the plurality of user interface elements within the theme.

Still further, in accordance with a preferred embodiment of the present invention, the method also includes generating a plurality of color adjacency graphs (CAG) and analyzing the graphs.

Moreover, in accordance with a preferred embodiment of the present invention, the method also includes selecting a subset of screens of the application as main screens.

Additionally, in accordance with a preferred embodiment of the present invention, the method also includes rendering all screens or only the main screens of the application.

Further, in accordance with a preferred embodiment of the present invention, the method also includes using a client side rendering framework to render the user interface elements.

Still further, in accordance with a preferred embodiment of the present invention, the method also includes providing data for fields of the user interface elements.

Moreover, in accordance with a preferred embodiment of the present invention, the method also includes previewing of user interface elements of the application on a mobile device.

Further, in accordance with a preferred embodiment of the present invention, the previewing includes adding a watermark to the application to indicate that it is not a standard application.

Still further, in accordance with a preferred embodiment of the present invention, the method also includes providing a user interface to display a plurality of websites built by the WBS and selecting one of the websites as input for the generating.

Moreover, in accordance with a preferred embodiment of the present invention, the method also includes executing a plurality of sub apps (s-apps), wherein each the s-app includes the XACF for a different website.

Further, in accordance with a preferred embodiment of the present invention, and also including executing a selected s-app for a single type of business.

Still further, in accordance with a preferred embodiment of the present invention, the method includes communicating with a recommender engine to recommend the s-apps.

Moreover, in accordance with a preferred embodiment of the present invention, the method also includes installing a selected one of the plurality of s-apps on the mobile device, and triggering the installing according to location detected by the mobile device, wherein the location is associated with the s-app to be installed.

Further, in accordance with a preferred embodiment of the present invention, the method also includes location detecting by one of GPS, Wifi, Beacon, inertial navigation, GLONASS.

Still further, in accordance with a preferred embodiment of the present invention, the method also includes communicating with a plurality of external preview servers located on the cloud to preview the application.

Moreover, in accordance with a preferred embodiment of the present invention, the method also includes a common app engine (CAE) to execute the XACF and executing the CAE directly on top of its server operating system.

Further, in accordance with a preferred embodiment of the present invention, the method also includes the CAE concurrently executing a plurality of XACFs.

Still further, in accordance with a preferred embodiment of the present invention, the method also includes running only the main screens on external preview servers.

Moreover, in accordance with a preferred embodiment of the present invention, the method also includes communicating with external preview servers and indicating to the preview servers to navigate to the main screens within the XACF.

Finally, in accordance with a preferred embodiment of the present invention, the method also includes communicating with external preview servers and providing data for fields of the user interface elements of the XACF.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
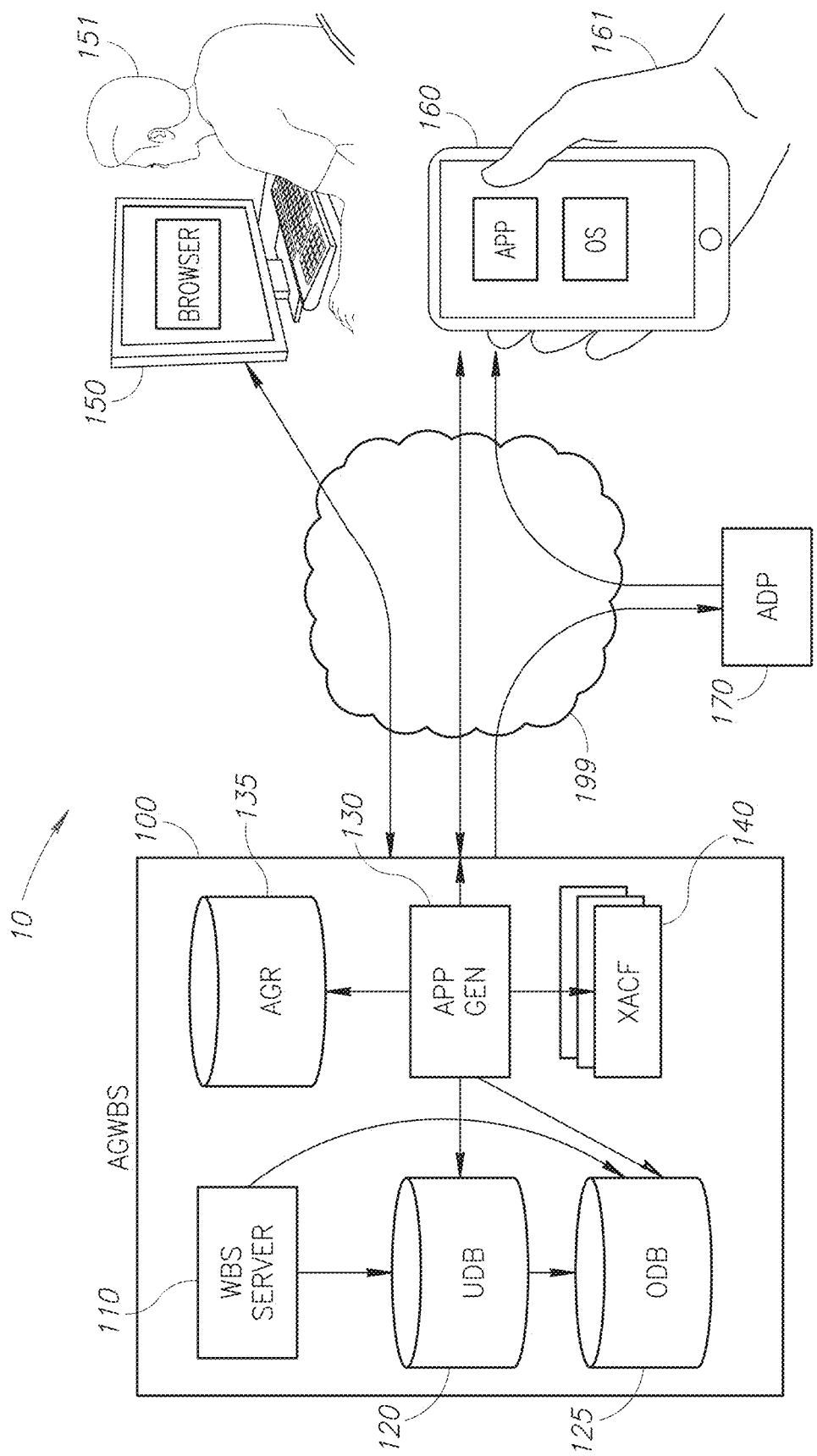
FIG. 1 is a schematic illustration of a website conversion system AGWBS capable of first creating a website and then creating a corresponding application.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that mobile devices (such as Smartphones, tablets, smart watches and the like) have gradually been replacing, or complementing, the full-featured desktop personal computers, laptops and other legacy computing devices. Such mobile devices are capable of connecting to the Internet, and are typically used to access websites. However, the website has to be adapted to be used by mobile devices, which have different display dimensions than the typical screens of a desktop or a laptop computer.

Applicant has also realized that mobile device native applications, otherwise known as "mobile device native applications", "apps", "mobile apps", "native applications", "native apps", may be designed and implemented directly on top of the mobile device operating system. Therefore, the native applications may utilize the entire set of software and hardware on the mobile device. In particular, apps may have direct access to mobile built-in input/output devices such as camera, microphone, speaker and the like, as well as to the local memory, CPU and storage unit. Mobile apps may be capable of directly accessing the device communication elements such as Wi-Fi, Bluetooth, IR and the like. The mobile app may use the local mobile device sensors such as GPS, accelerator, gyroscope (which determines the device angle), temperature sensor, fingerprint sensor, light sensor and the like. Additional mobile app capabilities may include specialized animation and other display technologies.

Applicant has realized that creating an integrated system, such as a website conversion system which provides an improved application creation environment and procedure, may result in creating superior apps for a mobile device.

Reference is now made to FIG. 1 which illustrates a website conversion system 10 capable of first creating a website and then creating a corresponding application, constructed and operative in accordance with a preferred embodiment of the present invention. Website conversion system 10 comprises an application generating WBS (AGWBS) 100, a computer 150, which may be a desktop computer, a laptop computer or any other computer which does not run a mobile operating system and is capable of running a browser, operated by user 151, a mobile device 160 operated by user 161 and an application distribution platform (ADP) 170, all of which are connected together via a communication medium, such as the Internet 199.

AGWBS 100 further comprises a WBS server 110 for creating and hosting websites, a unified database (UDB) 120 for storing website related information, an operational database (ODB) 125 for storing operational data used by both websites and the corresponding apps, an app generator 130 for creating corresponding mobile applications, an app generator repository (AGR) 135 and extended application content files (XACFs) 140 for storing application related information.

ADP 170 may be operated by a mobile device operating system vendor such as Apple or Google or by a $3^{rd}$ party. ADP 170 may enforce specific limitations and requirements on submitted apps, such as payment of submission fee for apps and app versions, requiring a (often lengthy) manual review of the app, requiring various information about the app, forbidding loading of executable code from the Internet and forbidding the application from changing its basic functionality.

AGWBS 100 may provide an environment to create websites and to generate corresponding apps therefrom. AGWBS 100 may be accessed from computer 150 or from mobile device 160. Once a website has been created within AGWBS 100 and hosted by it, a computer user 151 or a mobile user 161 may instruct AGWBS 100 to convert it to a mobile app, to be distributed by ADP 170. It may be appreciated that user 151 may be a website designer, a website user or both. User 161 may be an app designer, an app user or both. The capacities provided by website conversion system 10 to computer user 151 and to mobile user 161 are described in detail hereinbelow.

AGWBS 100 may integrate both online WBS editing, using WBS server 110, and mobile application creation, via app generator 130, by using common underlying databases UDB 120 and ODB 125 for both purposes. Prior art app creation systems, that create an application corresponding to an existing website, typically operate on the final HTML representation of the website for which the app is being built. These systems do not fully integrate with website building systems and thus cannot benefit from the website metadata stored in such systems. Some prior art app creation systems do provide some sort of integration with existing apps providing specific functionality, such as shopping cart systems like ShopGate system and the like, however there is no prior art system that provides a full integration with a website building system to benefit from all the underlying knowledge regarding the website stored in its database, or the ability to perform a deep analysis of the data stored in UDB 120 and ODB 125 and to perform complex conversion which may not map the components one by one.

In AGWBS 100 both the website creation server, WBS server 110, and the application creation server, app generator 130, use the same joint underlying databases UDB 120 and ODB 125. WBS server 110 may write information regarding the created website to UDB 120 and regarding its operational data to ODB 125. App generator 130 may read the stored information and use it in order to create an optimal version of the corresponding app. AGR 135 may store information to facilitate the creation of the app such as base app templates, component mapping information between web and mobile, readymade palettes, themes, sample apps, conversion rules and the like. It may be appreciated that the website and the application have similar functionality but may have different layout and structure—including the division into multiple pages/screens as well as the specific components included in each page/screen and their component attributes.

App generator 130 does not use HTML or any other representation, visual or otherwise, of the website. Instead it may use the much richer, and possibly internal, information stored in UDB 120, such as the high-level website definition, the vertical of the website, and the like.

UDB 120 may serve both as an app repository and as a data repository. UDB 120 may store website related information such as the website global attributes, website pages, components used in the different website pages, component instance attributes, styles and additional information.

UDB 120 may store hierarchically-structured component information describing the actual widgets and objects used in the websites. Some of the objects may be visual and some may not. ODB 125 may also contain additional information (such as products, prices, transactions, and the like) which are used by the website components (e.g. an e-Shop component or a product gallery component).

UDB 120 and ODB 125 may also be updated implicitly by the designer which may provide information, both structured and unstructured, about his business or other enterprises and the system may use this information to generate website elements and pages.

Data may also be entered to UDB 120 and ODB 125 as a result of importing and analyzing data from external data sources such as industry databases and social media presence which may be provided by a user of AGWBS 100 such as the user's Facebook page details, LinkedIn profile, specific business directory, business information sources such as OpenTable which provides restaurant menu information etc..

UDB 120 may store information about designer activity, such as system creation and maintenance activities log, as well as end-user usage information, in association with any of the methods above (e.g. website creation based on user-provided details or on gathered information). It may also include analysis of displayed screens and of user interaction with them as part of business intelligence (BI) data collection performed by WBS server 110.

UDB 120 and ODB 125 may comprise any known database technology including relational database, object oriented database, big data, flat files and the like and any technology combination thereof. It may be physically located with the other servers of AGWBS 100 or may be provided by $3^{rd}$ parties and be located in a remote location or any combination of local and remote servers.

It may be appreciated that all data needed by any client of the system may be stored in UDB 120 or ODB 125, including a preview version of the created app, as will be further detailed hereinbelow. Typically, UDB 120 may be updated during a website design process. In addition, UDB 120 may be updated to include data generated through additional user interfaces such as interfaces allowing end-users to edit the site in a limited manner. ODB 125 (and possibly UDB 120) may be updated by a data entry back-end user interface or dash-board user interface, or by any automatic data import tools that may import data by analyzing and converting existing websites, analyzing and converting data from other WBSs (e.g. WBS-to-WBS converter), analyzing and converting system definitions, UI and functionality from other applications or software systems, including those written in traditional programming languages as well as using other technologies and frameworks, (such as legacy technology systems).

In one embodiment of the present invention, app generator 130 may directly use the website information stored in UDB 120 and construct an app which is similar in structure to the website from which the app was converted. Using this procedure, the screens of the app the content of each individual screen and the flow of the app inside each screen and between screens are substantially similar to that of the website from which the app is converted.

Figure 2:
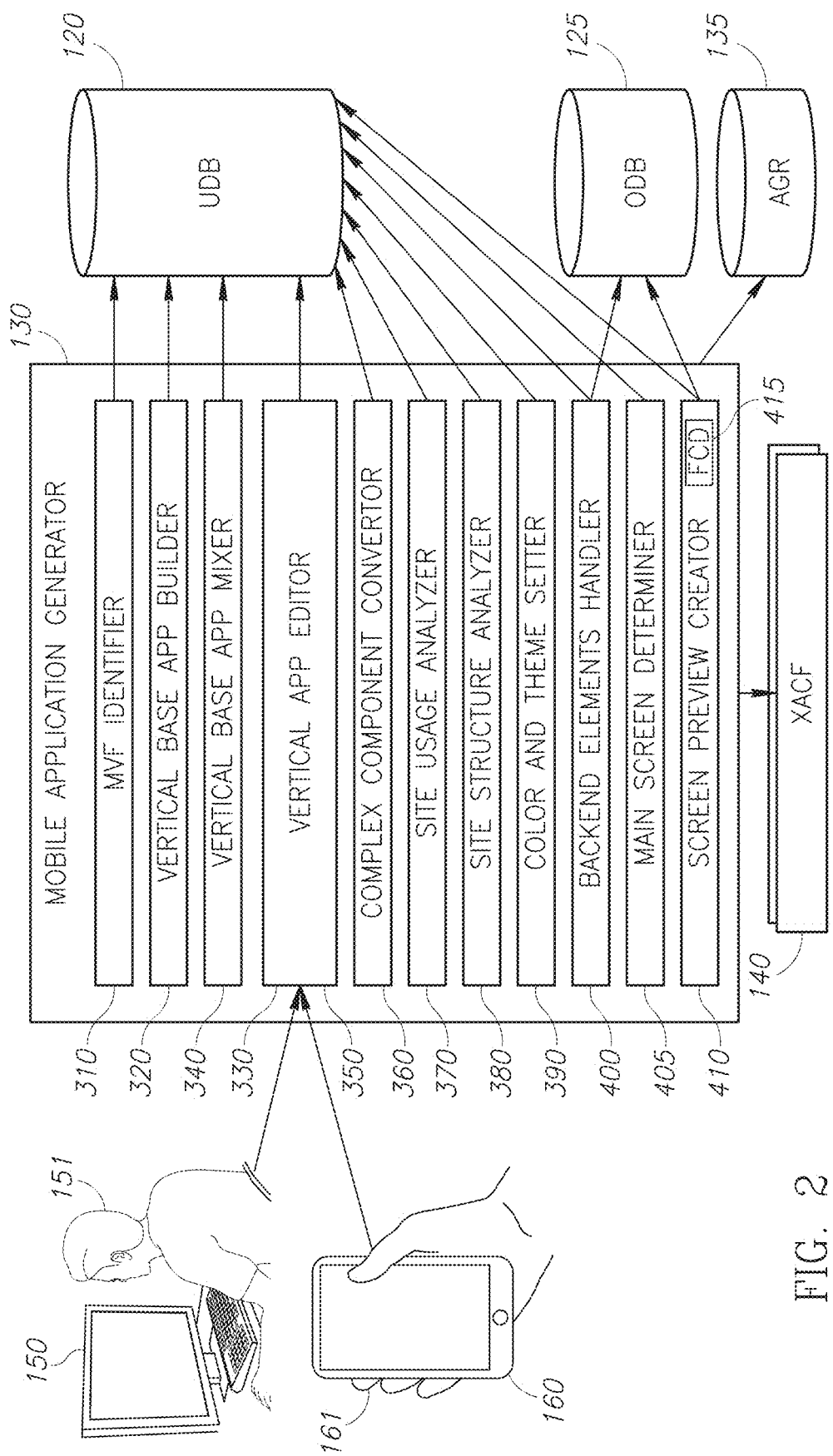
FIG. 2 is a schematic illustration a preferred embodiment of a mobile application generator.

In another preferred embodiment, app generator 130 may use additional information stored in UDB 120, in addition to the website information. This embodiment of app generator 130 is illustrated in FIG. 2 to which reference is now made.

App generator 130 comprises a main vertical functionality (MVF) identifier 310, a vertical base app builder 320, a vertical app editor 330, a vertical base app mixer 340, an app editor 350, a complex component convertor 360, a website usage analyzer 370, a website structure analyzer 380, a color and theme setter 390, a backend elements handler 400, a main screen determiner 405 and a screen preview creator 410.

App generator 130 may be activated by a computer 150 or a mobile device 160 and it may access UDB 120 or ODB 125.

ODB 125 may store specific operational website related information. For an e-commerce website, such information may be products, prices, orders and the like. The use of this information is described hereinbelow.

MVF identifier 310 may recognize the main vertical functionality of the website. This information may be taken from the website structure stored in UDB 120. The website structure, along with additional website related parameters, may indicate the site's "vertical", i.e. primary vertical application/functionality. The website related structure and parameters may include the website vertical specific templates, specific major complex components such as a blog or an e-shop component used in the site, third party applications (TPAs) used as a major part of the website and the like. Additional information may include special hints attached to specific components or TPAs in the website or specific guidance associated with the templates provided by WBS server 110 and used by the designer during the creation of the website. For example, the WBS server 110 may provide specialized high-resolution photo gallery components, and attach a special hint indicating that when two or more such components are used in a website, the main vertical functionality of that website is a photographer portfolio display. It may be appreciated that WBS server 110 may be used to create user interface elements, and templates to be used later by website designers. These templates and user interface elements may include special conversion hints.

The information needed by MVF identifier 310 in order to correctly identify the vertical may be stored in UDB 120, as described hereinabove. In some cases, when a website includes multiple complex TPA's, the MVF identification may be difficult. This may be the case when a website contains, for example, both an e-commerce TPA and a blog TPA, both of which may be identified by MVF identifier 310 as the website's MVF. In such a case, MVF identifier 310 may employ a number of heuristics, and may access additional information stored in UDB 120 and the ODB 125, besides the website structure, in order to decide which vertical is the most prominent vertical in the site. Referring to the e-commerce/blog components case mentioned hereinabove, the MVF identification may be based on comparing the users' activity, collected as part of the BI information and stored in UDB 120.

The compared information may be the amount of back-office data entered in each vertical, for example the number of posts entered to a blog compared to the number of products in the e-commerce, or the level of engagement in the different site's verticals as reflected by the time spent by the user editing the blog compared to the time spent editing the store. The compared information may be the visited pages, number of visits in the store compared with the number of visits to the blog section.

The compared information may be related to the website information, such as the prominence of each vertical in the website as reflected by the location of the components in the website or in the specific page containing them. For example, which vertical solution components are located in the main page compared with components located in a menu. Or the number of internal links to one vertical compared with the other. Any such heuristic, that may imply a vertical prominence, may be used by MVF identifier 310.

MVF identifier 310 may also determine that a website contains multiple active MVFs and not a single one. An example for such a case, where a single vertical cannot be determined and multiple verticals are identified, may be a website combining booking and e-shop for use by a gym which also sells sports goods.

Further details and methods related to the determination of vertical elements inclusion and activation in the WBS-based website are described in U.S. patent application Ser. No. 15/168,295 filed May 31, 2016, now issued as U.S. Pat. No. 10,558,998 on Feb. 11, 2020 and assigned to the common assignee of the present application.

As is known in the art, one common app engine (CAE) may be used by multiple apps, each having specific files defining its specific functionality and layout. Apps created using this technology are called "data driven apps" as the functionality and user interface provided by the app are determined by the application specific data files provided to the CAE. The data files may include the app definition (e.g. its underlying component, layout, style and workflow information) and may also refer to additional auxiliary content files such as pictures and icons used as part of the application user interface.

The data files used by the CAE, including the main data files (the ACF) and the auxiliary content files, form together an extended application content file (XACF). The main data files (the ACF) are typically defined using a data description language which allows the use of complex hierarchical and repetitive structures, such as XML or JSON, but may be implemented using any other suitable language.

The XACF in data-driven apps may also include some logic implemented in an interpreted language such as JavaScript, in addition to the data files and the auxiliary files. Such interpreted code may be useful to implement business logic and user-interactions which may require conditional logic. The interpreted logic may access external servers and services such as external database elements. These elements may be located in the remote server while they may be displayed by the app.

Base app builder 320 may provide a specific extended application content file (XACF) 140 applicable to the converted website vertical or sub-vertical identified by MVF identifier 310. The provided XACF file may be created from existing XACF files that may be used as templates for different supported verticals and sub-verticals. The provided XACF file may be the first version of the file that may be further modified.

The XACF provided by builder 320, may capture the primary user experience of the vertical or sub-vertical application area with respect to the converted website. A base app may be an e-commerce vertical app, a real-estate broker app, a music fan vertical app and the like.

Base app builder 320 may provide multiple versions of each base app for different mobile device models and platforms and versions thereof (e.g. different versions for different Apple iOS versions and Google Android versions etc.). Base app builder 320 may also provide various generic base apps which are general purpose base applications and do not implement any specific vertical functionality.

Base app builder 320 may provide additional functionality, not provided by the corresponding website. For example, an e-commerce oriented website may offer a "flat" structure in which all product pages are similar and are siblings of the main website page. The corresponding app, in contrast, may offer a different screen structure involving a fully hierarchical screen arrangement with product groups and sub-groups. An e-commerce web website might employ a large gallery for a selection of six products available in an e-store, possible due to the large display area available to the web site. When creating the corresponding app, vertical base application builder 320 may replace this gallery with a slider gallery, offering a full screen view of each product and the ability to swipe between products. The designer may use app editor 350 to edit screens of the automatically created gallery, possibly changing it to a different gallery type or changing the information and layout displayed for each product.

Base app builder 320 may convert a flat website into a non-flat multi-screen app. For example, a desktop website may include a flat checkout page in which everything can be found on the same screen, i.e. the payment method choice, the shipping method choice and the shipping address. The converted app may include alternative mobile-optimized checkout flows that may be split on several screens and may use native device capabilities to reduce the amount of typing, such as using the GPS to pre-fill some of the address-related fields. In addition, if a payment application, such as Apple Pay, is installed on the mobile device, the checkout flow may not show the credit card entry form at all, and may use the credit info already saved by the installed payment application. In this case, Base app builder 320 may create an XACF supporting both payment alternatives and activating the appropriate flow when used, in accordance with the existence or absence of a payment application on the mobile device.

Base app builder 320 may add specific mobile-oriented functionalities not available through the website. For example, when converting an e-commerce website, vertical base application builder 320 may add an instant messaging capability to the created e-commerce app.

In another example, relevant to e-commerce websites, vertical base application builder 320 may add an extra screen to the created e-commerce app to allow users to mark products as favorites and to create a wish list, even when such functionality is not part of the corresponding website. Personalization is an important aspect of mobile apps, as a mobile device is much more personal than a desktop computer, so vertical base application builder 320 may add a wish list screen to the app. The wish list may be helpful for the mobile device owner and may fit better to the mobile device app.

The swiping approach of the wish list screen, added to the favorite screen by vertical base application builder 320, may be similar to the swiping approach of "Tinder". "Tinder" is a popular mobile dating app. It displays photos of potential dating matches. The user can swipe photos of potential mates he likes to the right, and swipe photos of potential mates he does not like to the left. The wish list of the e-commerce app may have similar user interface. The user may see a list of products and may swipe right if he likes the product and may swipe left if he doesn't like it. Such wish list functionality in an app may require some support from AGWBS 100 and may be implemented by a dedicated backend code to save all the selected favorites into the ODB 125.

Vertical base application mixer 340 may merge screens from several base apps to one app containing a complete set of screens. During this procedure, vertical base application mixer 340 may unite screens which appear in both base apps into single instances of each screen.

Vertical base application mixer 340 may include the elements of one base app as sub-elements of another base app, when one base app is clearly more "dominant" then the other base app.

It may be appreciated that vertical base application mixer 340 may mix any number of base apps into a single app and may use the appropriate technique for each additional base app added to the mix.

App editor 350 may be used by a designer, who may be using computer 150 or mobile device 160, to modify the look and feel of the base app created by vertical base application builder 320. The modifications may be done by customizing the parameters defining the theme of the base app. The designer may also add and delete screens. He may also modify any screen and any element inside the screens. He may further add elements to a screen; he may also modify elements in the screen and may change their location, their sizes and their appearances. The designer may also delete elements from the screen.

A converted app is typically created on behalf of a specific designer and a specific website, and app editor 350 may allow only the owner of the base app to edit it. In addition, an owner of a base app may use app editor 350 to perform some theme modification and editing on a base app that may be used later by several other applications of the same owner sharing the same vertical. The modifications done to a shared base app may apply only to the specific designer and do not apply to other designers, that may continue to use the unmodified version of the base app.

An example of using a modified shared base app may be for a user owning several e-commerce websites. The designer may use WBS server 110 to create each and every website for his e-commerce. App generator 130 may convert the created websites, and the designer may modify the appearance of one of the converted applications. The designer may want to apply the same modification(s) to his other generated e-commerce apps so he may specify that the modified base app is a shared base app. Doing so will assign the same modified share app to all specified e-commerce apps such that they will share the same layout and customization.

The various base apps may use one or more common CAE, possibly sharing page structures and layouts, components and widgets. Some components, such as instant messaging client windows (allowing chats between end-user to user and between multiple end-users), may be particularly suitable for use in multiple CAE apps and base apps.

As described hereinabove, mobile application generator 130 may generate the content and the parameters for the base apps by analyzing data stored in UDB 120. Mobile application generator 130 may then create the appropriate XACF which together with the appropriate CAE form the converted app.

The app templates used by base app builder 320 may be associated with websites templates provided by WBS server 110 and used to create the website to be converted. App builder 320 may provide an applicable app template to match each website template provided by WBS server 110.

App editor 350 may offer a different list of alternative designs/layout to the website designer and to the app designer. The proposed layouts may be designed by the professional staff of AGWBS 100, may be imported from external sources, may be extracted from existing layouts outside AGWBS 100, e.g. of other web pages or other sites, created by AGWBS 100 or by other means, may be acquired from a layout marketplace or may be automatically generated or expanded. Further details regarding sourcing, creation and selection of layouts may be found in the patent application publication no. US 2015-0310124 published Oct. 29, 2015, now issued as U.S. Pat. No. 9,747,258 on Aug. 29, 2017 and assigned to the common assignee of the present application.

When MVF identifier 310 determines that a website contains multiple active verticals, the created app needs to be created from a combination of several base applications to form a mixed base application.

An example for a mixed application may be a website that includes both hotel vertical elements and restaurant vertical elements. This can happen when a hotel owns a high-profile restaurant. The website includes both hotel and restaurant features and so should the converted app. In this case the app should be a mix of two base apps that may merge the functions of a hotel base app and a restaurant base app.

The designer may wish to make changes to the converted app, to make some adaptations, modifications and customizations. App editor 350 may support editing the converted app at multiple levels. It may be appreciated that the app editor 350 may be used in any stage during the creation and the lifetime of the app.

App editor 350 may allow the user to specify the themes and other display parameters of the converted app. Such themes may include the use of colors, fonts, backgrounds, frames, paragraph style and similar visual elements. In addition, app editor 350 may allow the user to select different display widgets and to configure the converted app. App configuration may include, for example, the definition of which pages and features are active and which are not, and the order of app screens and menus—as some base apps, and thus converted apps, may allow a separate active/inactive designation to be applied to some of the app's screens or sections.

App editor 350 may also allow the user to insert additional screens to the converted app. App editor 350 may enable the user to select website pages, already defined and stored in UDB 120, and add them to the converted app. Such screens may be for example an "about" screen or a "terms of use" screen, and could be sourced for example from other sites of the same designer or other designers subject to relevant access privileges, intellectual property ownership and privacy considerations. App editor 350 may enable the user to modify the added screens in the context of the converted app. In addition, the added screens may be converted from the web page to an app screen using the functionality described in the patent application publication no. US 2015-

0074516, published Mar. 12, 2015, now issued as U.S. Pat. No. 10,176,154 on Jan. 8, 2019 and assigned to the common assignee of the present application, that defines methods to adapt website pages to mobile, typically smaller, screen sizes.

App editor 350 may provide means to fully edit each and every screen and element of the converted app. The editing functionality may include moving and resizing displayed components. App editor 350 may include an internal "mini WBS" editor controlling the layout and settings of the components included in the app which may be similar to main visual editor used in the WBS server 110 to edit website pages. The modified app layout and settings, including the screens and component layout may be stored in XACF 140.

App editor 350 may also be capable of changing some or all of the layout properties. For example, the "featured products category" property of an e-commerce app which is a specific layout and design used to show current promoted products may be used by the designer for a specific component in a specific screen. App editor 350 may then suggest this layout and design to be assigned to similar components in other screens. Each property used in the app may be assigned a unique ID and app generator 130 may share property values between screens. In some cases, multiple properties may in fact be multiple instances of a single property value, i.e. the same property value may be represented in multiple places and apply to multiple objects, and changing it in one screen may affect all other instances. In some other cases, some properties may be similar, however, changing it in one screen, even though it may be relevant to other screens, will not change it in these other screens.

App editor 350 may provide several layout options from which the designer may choose the appropriate layout for each screen. Layouts may differ in the appearance and location of elements in a screen and the like. For example, some layouts may include large images and little text, some layouts may include multiple animated components and image/screen transitions and some layouts may use blur layers to indicate where the user should focus by blurring the less relevant screen areas when the user need to focus on a specific area.

App editor 350 may assign a meta-data tag such as "heavy animation", "many images", "few images" etc. to each created or imported layout. The tag may be manually assigned by the designer or may be automatically assigned by app editor 350.

App editor 350 may assign a combined complexity and customizability score (CCC) to a layout. Some layouts may have a low CCC indicating that they are easy to use, and contain very few properties but offer very limited customization capability. Some layouts may have a high CCC indicating that they have many properties, and the user may need to invest some time in entering all the properties but on the other hand may allow greater freedom of expression. The CCC score assignment may be done based on the number of configurable properties present in the layout.

App editor 350 may also assign a complexity score to the designer according to his usage statistics as collected in the BI information stored in UDB 120. This score may be used by computer 150, or by mobile device 160, as described in more detail hereinbelow. The BI information may include the layouts the designer has previously used, his engagement level and the like.

App editor 350 may operate on absolute layouts, relative layouts or responsive layouts, which are defined relative to the screen size and adapt well to multiple mobile device screen sizes.

A variety of components may be included in a website created through AGWBS 100. All the information regarding the components used in the created website, along with their functionality and semantics is stored as website metadata in UDB 120.

App editor 350 may choose the specific editor UI to display to a specific designer according to his proficiency and engagement as described hereinabove. This editor UI may be presented by the app editor UI 1510 on the user client side as further described below.

Complex component convertor 360 may use the stored component related metadata to improve the conversion of components from the website to the app. For example, a blog component used in a website may include multiple cooperating sub-components such as a blog post feed, a current blog post viewer, a blog post editor, talkbacks viewer, etc. Each sub-component may be typically represented by multiple HTML frames and elements in the website. Furthermore, these blog sub-components may appear in some workflows and may not be displayed in some scenarios. An example that illustrates this functionality may be a talkback viewer that is not shown while the user is not watching any blog post.

As mentioned hereinabove, prior art systems do not have access to website metadata and instead perform the automatic app creation based entirely on the HTML representation of the site. Those systems may have difficulty converting such complex components.

Complex component convertor 360 may generate a preferred app version of any complex component, based on its layout, settings, parameters, content and other metadata stored for the website in UDB 120. Complex component convertor 360 may support multiple versions of the mobile app complex widgets, and select the most appropriate one for each specific case. For the blog example, one mobile app blog widget may include a talkback editor and another one may not. Complex component convertor 360 may select the best option based on the configuration and the metadata of the blog component in the website.

Complex component convertor 360 may, in addition, use the BI information, stored in UDB 120, regarding any specific modifications made by the designer to the original web-based component. For example, the designer may have changed the default position and size of some sub-components in the original website and app generator 130 may apply such changes to the relevant items in the generated app.

In addition, complex component convertor 360 may use component semantic roles as defined in patent application publications no. US 2015-0074516 published Mar. 12, 2015 and US 2015-0310124 published Oct. 29, 2015, both assigned to the common assignee of the present application, when creating the app representation of a component. For example, complex component convertor 360 may determine that a text component with a specific size and shape, located next to a picture component, is in fact a caption describing the image in question, and accordingly, may convert the two web components into an image-caption pair component in the converted app. In another example, complex component convertor 360 may utilize semantic role analysis to determine that a given image field is a logo. This determination may be made based on the image field position in the screen, its appearance repetition, its size, its relationship to other components known to be related to a business logo, its content and the like. Based on this analysis, the image, identified as the business logo, may be offered to the user or used by default as logo in the app screens and as the app logo in ADP 170 (FIG. 1).

In another example, complex component convertor 360 may utilize semantic role analysis to determine that a collection of input fields in the website may, in fact, be a contact form, though there was no specific usage of a form object. In this case the designer decided to design the form manually. It may be the case that the designer did not use a contact form widget provided by UDB 120 or alternatively, AGWBS 100 may not have the specific contact form element required by the website designer. Complex component convertor 360 may replace the set of input fields used in the website with an app contact form element. It should be noted that an app contact form may be substantially different from the contact form used in a website. In a website, for example, the contact form may have an input field for the email address of the user so that the website owner may reply to received inquiries. This field may not be required in an app as the mobile device may use the pre-populated email addresses of the mobile email app.

Moreover, mobile app may skip e-mail address related input fields in a form and may use the SMS, voice phone call or any messaging app installed on the mobile device instead of using mail, when these functions are available on the mobile device.

Complex component convertor 360 may replace complex components used in a website with other components that better suit the app, or a specific mobile device and its operating system. It may add elements to the app not previously used in the original analyzed website. Using the same app contact form example used hereinabove, the system may generate a map screen showing a venue location and instructions to reach it, even though no such page exists in the original website.

Site usage analyzer 370 may analyze the pattern of use from the collected BI information stored in UDB 120. The pattern may be from editing sessions of the website through WBS server 110 or of previous editing sessions of the app through app editor 350 by the designer or website usage by end-users. Site usage analyzer 370 may also analyze the site's back-end information access through the back-end elements manager 400 or stored in the ODB 125. For example, website usage analyzer 370 may determine that three specific product categories are used in an e-shop much more frequently than any other product category, and may, as a result, select the appropriate product category selection widget for the app to display these categories prominently.

Figure 3A:
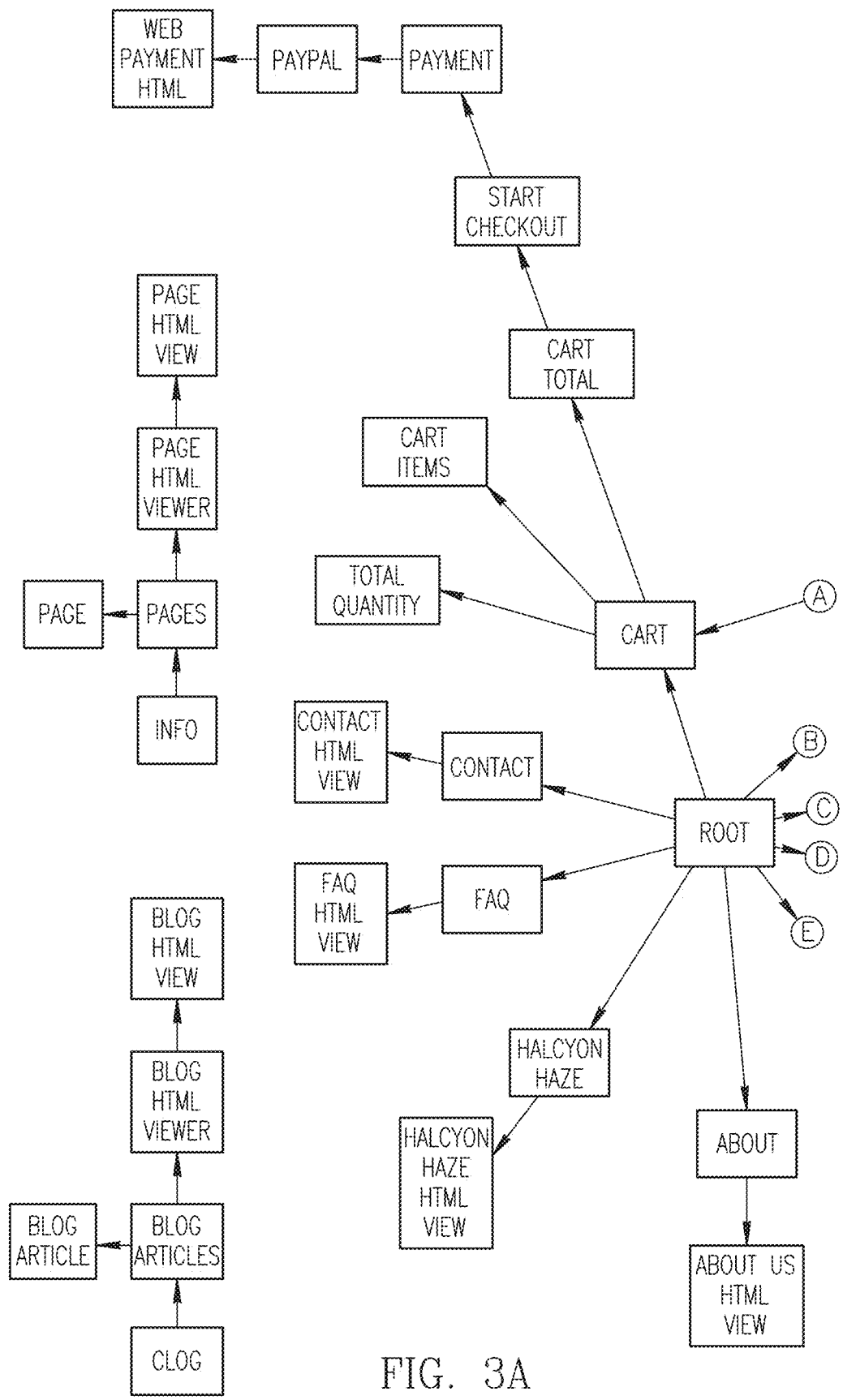
FIGS. 3A and 3B are together a schematic illustration of an exemplary visualized component graph.
Figure 3B:
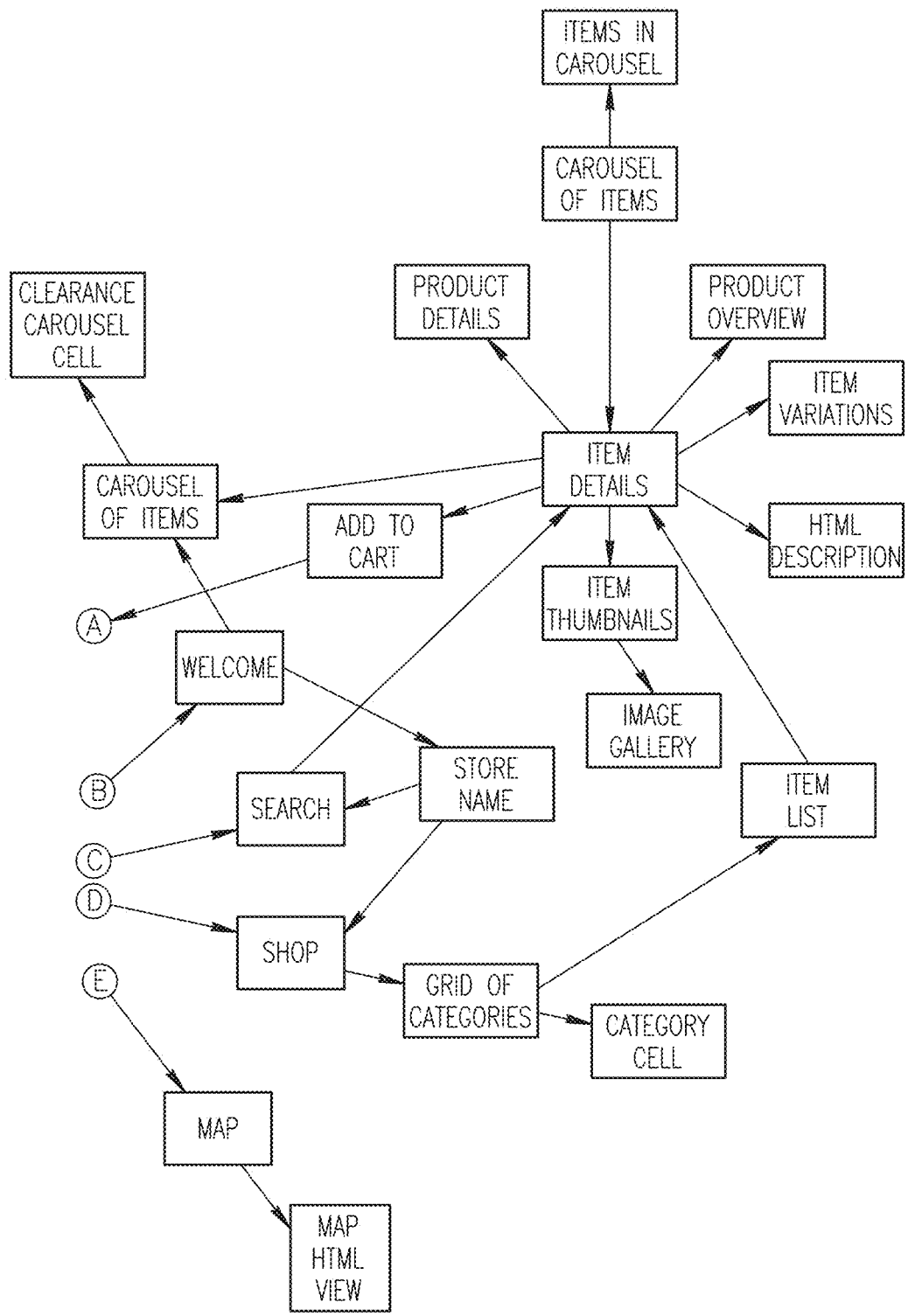
Figure 4:
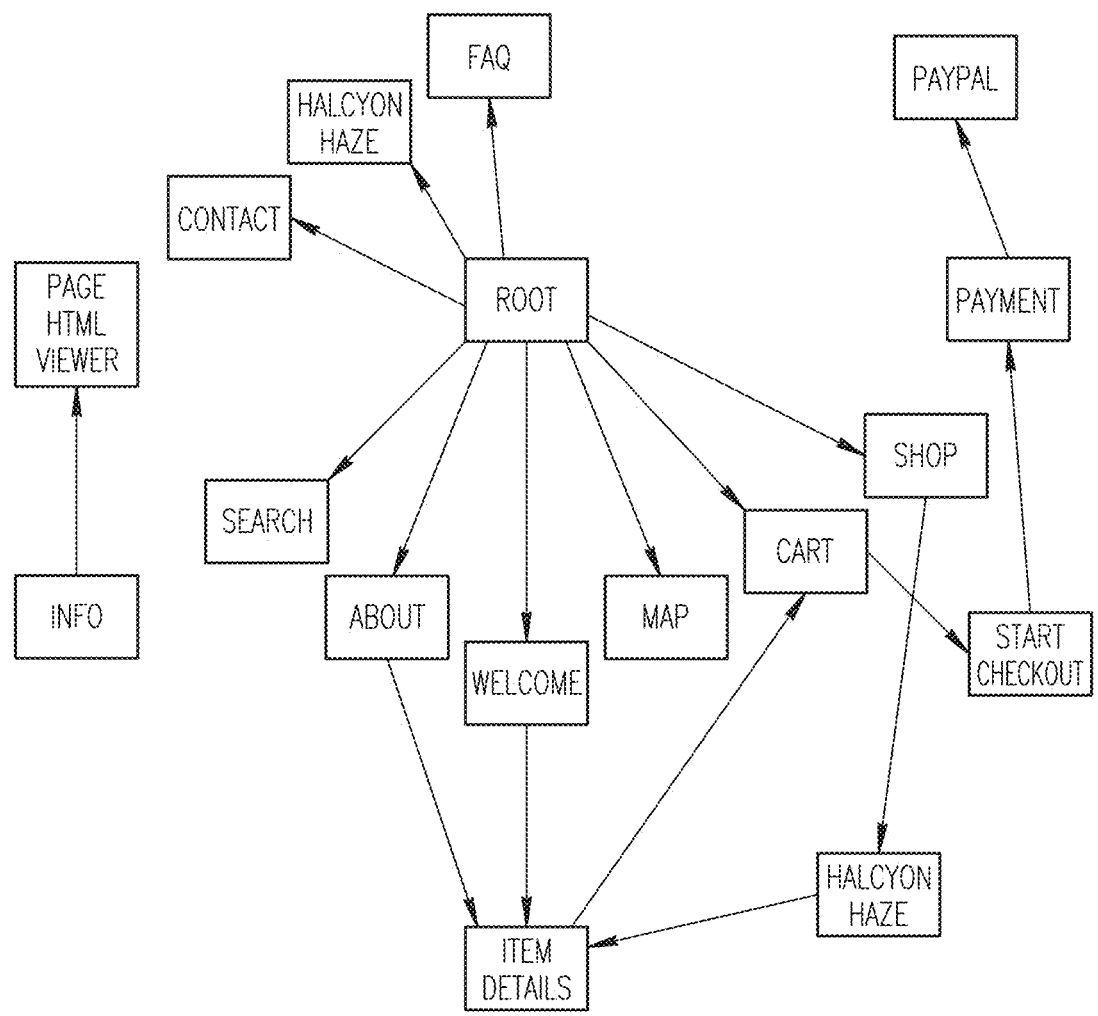
FIG. 4 is a schematic illustration of an exemplary visualized page graph.

Site structure analyzer 380 may analyze the website structure in order to determine, according to the page and component interconnections, which screens to include in the app and how to organize them. The website structure analysis may be based on a graph describing the page and component interaction where pages and components being the graph nodes and possible transitions between pages and components being the graph edges. FIGS. 3A, 3B and 4 illustrate an exemplary visualized component graph and page graph respectively.

Site structure analyzer 380 may be fully or partially automated. In the partially automated graph analysis, the website structure may be displayed in the browser as a graph and the designer may modify the nodes and edges in the displayed graph, changing the app layout. The app screens may be constructed according to the analysis of the final graph.

The system may include an app generator repository AGR 135 of relevant mobile app sub-sections and associated screen/component sub-graphs describing each such sub-section. Site structure analyzer 380 may search for match or similarity between sub-graphs in the website screen/component graph and app sub-section graphs from AGR 135. An example can be an e-commerce site, with 3 prominent product categories (e.g. books, games, movies), and a dedicated page for each category linked to from site's home page. Site structure analyzer 380 may classify each of these pages as a category display page because their website component graph (for each page) matches the sub-graph associated with this type of page (category display page which display a major website product category). The system may use algorithms for graph similarity or sub-graph matching known in the art such as Danai Koutra, Ankur Parikh, Aaditya Ramdas, Jing Xiang Machine Learning Department, Carnegie Mellon University 2011 "Algorithms for Graph Similarity and Sub graph Matching" <https://www.cs.cmu.edu/~jingx/docs/DBreport.pdf>. The search algorithm used should focus on similarity rather the precise match.

The app elements or sub-screens thus selected by the website structure analyzer 380 from AGR 135 may be "floating", i.e. may not have a pre-defined connection to the rest of the generated application. The website structure analyzer 380 may perform similar graph searching analysis for potential structures and layouts for the generated app, so as to locate such app structures and layouts which contain sub-graphs matching the selected app elements, and use this analysis to locate the right place in the app structure into which to plug-in the selected app elements.

It may be appreciated that the generated app widgets may not be similar to their website counterparts as app generator 130 may find a different, more suitable, widget, to use in the app than the one used in the website. An example can be using a picture caption displayed using a floating text element above the picture in the app, instead of being below the picture in the original web site.

The color and theme of the application screens may be determined by color and theme setter 390. The created app layouts may be different from the corresponding website layouts, as defined by the designer and stored in UDB 120. As discussed hereinabove, the app screens, widgets, flows etc., created by app generator 130 may often be different from the ones used in the corresponding website created by the designer. Therefore, the original website color assignment may not fit the generated app, and a new color assignment should be generated for the app.

Some specific colors may frequently appear in the website as they were perceived by the website designer as brand colors that identify of the website and the website owner. These brand colors may also feature prominently in the created app, however they should still form coherent and aesthetic combinations with other colors used in the app.

Color and theme setter 390 may analyze the website colors by extracting color information such as the brand colors and identifying any layout specific set of color constraints. An example of a constraint may include regions adjacency color constraint—where two regions sharing a border should have distinct colors, similar to the well-known map coloring problem. Another constraint may be related to color matching and color clashing. Color and theme setter 390 may suggest color alternatives in cases where there are color constraints in the app in order to make it aesthetically pleasing. Color and theme setter 390 may suggest other color options or may create a comprehensive set of colors, from a small group of app base prominent colors, and may suggest a set of pre-made color palettes to the app designer to test for an aesthetically better layout.

It may be appreciated that changing any color, including the brand color, used by the created app may ripple through all the screens and may change multiple components using that color. Replacing specific colors by other colors may cause the new, replacing, colors to be included in a recently used colors list used for color suggestion. Color and theme setter 390 may also suggest color palettes, from a predefined list, similar to the replacing color to allow the designer to apply this palette for the entire app in one click which may enable changing the entire look and feel for the app, such as to have a special "Christmas look" very easy and fast.

Backend elements handler 400 may handle all elements that have no visual representation in the website and in the application. A website may contain vertical specialized elements (VSEs) which do not have a displayable representation or on-screen presence. Such VSEs may be a specific WBS client-side code, pre-installed client native elements, WBS server-side logic and the like.

Main screen determiner 405 may define a subset of the app screens defined as main screens. The screen selection may be based on their importance in the app such as category and product picker in an e-shop app. Main screen determiner 405 may provide a limit to the number of main screens, which may be configurable by the designer. Alternatively, main screen determiner 405 may define the main screens according to the screen score analysis defined hereinbelow.

A screen score may be part of the metadata provided by the designer. The metadata may be hints provided by the converted website or its underlying templates. A hint may be an instruction to select screens with specific content such as a category picker, a product picker, a shopping cart and the like in an e-shop.

The metadata may be some indication, provided by the base app(s) used to create the converted app, on specific screens that mark them as important. Metadata may be created by analysis methods such as those described hereinabove for creating the XACF, including in particular semantic role analysis; pattern-of-use analysis, e.g. pages in which the users or end-users spend considerable time or perform substantial activity; page graph analysis and important screen detection, such as the pages directly connect to home page (as illustrated in FIG. 4); graph connectivity analysis, e.g. which screens are linked to most other screens; page type identification processing, which may identify important pages according, for example, to their visual attributes as described in patent application publication no. US 2015-0310124, published Oct. 29, 2015, now issued as U.S. Pat. No. 9,747,258 on Aug. 29, 2017 and assigned to the common assignee of the present application.

Main screen determiner 405 may also use any of the methods known in the art when analyzing pages for importance, such as the methods used by search engines for page importance ranking in search results or any combination of such methods.

Screen preview creator 410 may automatically generate a version of the screens for preview purposes. This may be done by creating screen versions for each of the sub-elements/sub-widgets from which the mobile device layouts may be constructed. Screen preview creator 410 creates the preview based on the created XACF 140. Once XACF is ready screen preview creator 410 may convert the files used to define the mobile device layouts into files defining corresponding SVG layout templates, resulting in further automating the creation of SVG preview. As further described below, the system may also use other client-side rendering framework (such as Adobe Flash or WebGL) rather than SVG. Screen preview creator 410 may also function in parallel to the XACF 140 creation process, so that the XACF 140 and the various preview versions are created simultaneously.

Furthermore, the website definition may include additional elements such as TPAs, WBS-specific events, WBS-specific events actions, WBS-specific events logic, embedded interpretive code and the like.

App generator 130 may have full access to UDB 120. UDB 120 may store, among other website information, information regarding all backend, non-visible components, and app generator 130 may analyze all these non-visual aspects of the website. Backend elements handler 400 may include these elements in the app generation process and may replace them with the matching app-embedded elements.

It may be appreciated that prior art systems, which convert regular websites to applications, without integration with the WBS, may be unable to access such website elements and thus may not be able to analyze them properly.

It may also be appreciated that websites, business websites in particular, often access one or more databases containing website specific related back-end data, such as inventory, orders, products etc. Such databases may be managed through the presentation layer of the website (i.e. the visible widgets and components of the site), but are not a part of that presentation layer by themselves. Such website databases may be part of UDB 120 or may be separately managed inside ODB 125 (as shown in FIG. 1), even residing in separate servers and possibly managed by a different organization. For example, AGWBS 100 may implement e-commerce site management in which some of the inventory/order/product databases are managed by an associated (but separate) enterprise resource planning (ERP) system. Such an ERP system (and its databases) may even be hosted by a separate ERP-as-a-service vendor.

The application generation process in prior art system is typically limited to analyzing the website's presentation layer, and may not access or analyze the content stored in ODB 125.

Backend elements handler 400 may analyze the information, stored in ODB 125 regarding databases used by the website and may use this information to define parameters in the app presentation layer. Backend elements handler 400 may select a different carousel, slider or other selection widget according to the amount of elements to be presented. It may use a different product category selection widget according to the number of items the widget needs to display. If the app needs to display 3 items the selected widget may be a scroll-on-tap carousel and if the app needs to display 300 items, backend elements handler 400 may use a grid-based selector. The selected widget may further affect the application flow in addition to the widget selection.

Backend elements handler 400 may add promotional features, such as popular items, featured items, on-sale items, etc. based on analysis of an e-shop's data attributes in the remote DB as further described hereinbelow.

For example, when converting an e-commerce website, backend elements handler 400 may access the ODB 125 so as to analyze the product information database, e.g. count how many products exist, how many collections, the percentage of products not categorized under any collection etc. and make decisions accordingly. For example, if most products in the store are categorized as collections, backend elements handler 400 may make the collections tab the main navigation method of the app. If many products aren't under any collection, backend elements handler 400 may show a full product browser with a search capability as the main navigation option etc.

Figure 5:
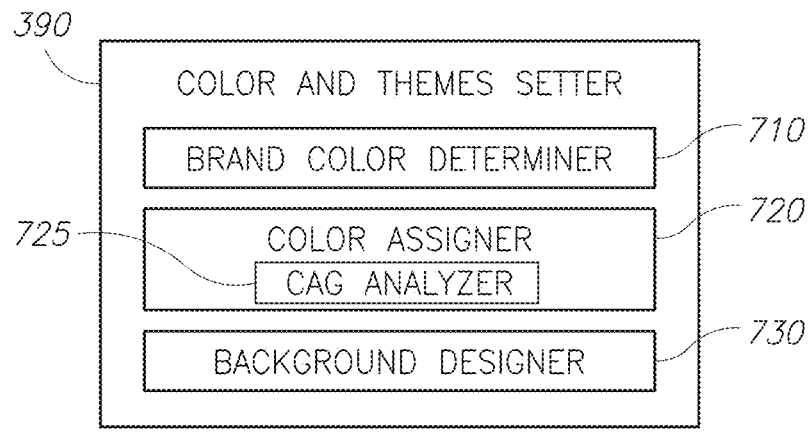
FIG. 5 is a schematic illustration of color and theme setter.

FIG. 5, to which reference is now made, specifies in more detail the structure and functionality of color and theme setter 390, described hereinabove. Color and theme setter 390 comprises a brand color determiner 710, a color assigner 720 and a background designer 730.

Brand color determiner 710 may determine the brand colors of the site. The brand colors are the main colors which characterize the website, and form part of the brand identity of the website owner. Brand color determiner 710 may perform a color analysis on the website colors as stored in UDB 120 and determine the brand colors of the website in order to define a single dominant color to use in the application. Brand color determiner 710 may extract the brand colors from the user's website and may use it (for example) for application-wide UI elements (such as the title bar) which may appear multiple times and/or prominently in multiple screens of the generated app.

Color assigner 720 may assign multiple colors to the user interface elements of the app such as screen and widgets, product gallery etc. Some of the major colors, such as the heading colors, may be selected from the brand or other dominant colors, or may be provided by the designer. Other colors, such as text fields and titles, may be automatically provided by color assigner 720.

Color assigner 720 may automatically assign colors to elements or may use colors provided by the designer. Automatic assignment of colors may be based on the brand colors as identified by brand color determiner 710, on the color adjacency graph as further described hereinbelow, or on previous user provided color assignment or the like.

Color assigner 720 may use the different techniques interchangeably if several colors are to be assigned. Color assigner 720 may assign one color using one method, e.g. provided by the user, and assign another color using a different method, e.g. the system may determine the color according to a color choice made by the designer earlier.

Background designer 730 may add new background images to the created app, background images that were not present in the matching web site's user interface. Background designer 730 may create the required background images automatically based on other images taken from the website such as product images and the like. Background designer 730 may create highly aesthetic images that may be relevant to the application business and may be used as background images in the created app.

Background designer 730 may, for example, work on an e-commerce website containing lists of textual category names. Lists of textual category names may be a good choice for a website, where categories are selected from a textual menu, however such a list may not be satisfactory in an app as the app may need to have a dedicated screen for the category list due to the device smaller screen size. In this case background designer 730 may use the product images as background images to the created category selection screen in the app.

Figure 6:
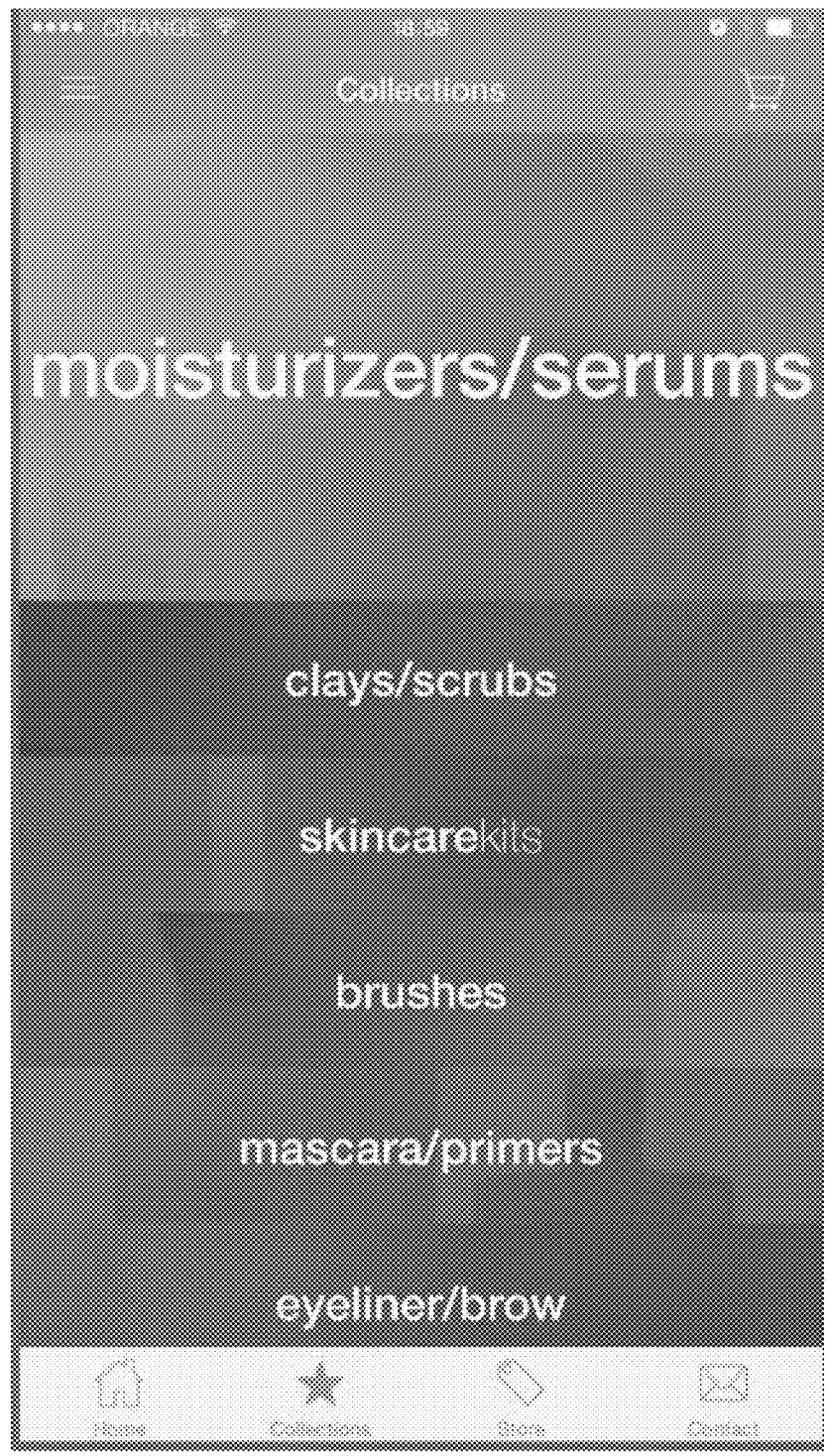
FIG. 6 is a schematic illustration of an example aesthetic category selection table user interface created by color and theme setter.

Background designer 730 may use an image as the source of the background image. A possible resource for images, to be used by background designer 730, may be images used in the website and stored in UDB 120. Such resource may be, in an e-commerce website, a product image from a product category collection. After selecting an image for the background, background designer 730 may create the background and use the resulting image as the background for the category name. The converted images may be used as background of table cells representing product categories, creating an aesthetic category selection table user interface as illustrated in FIG. 6.

Figure 7:
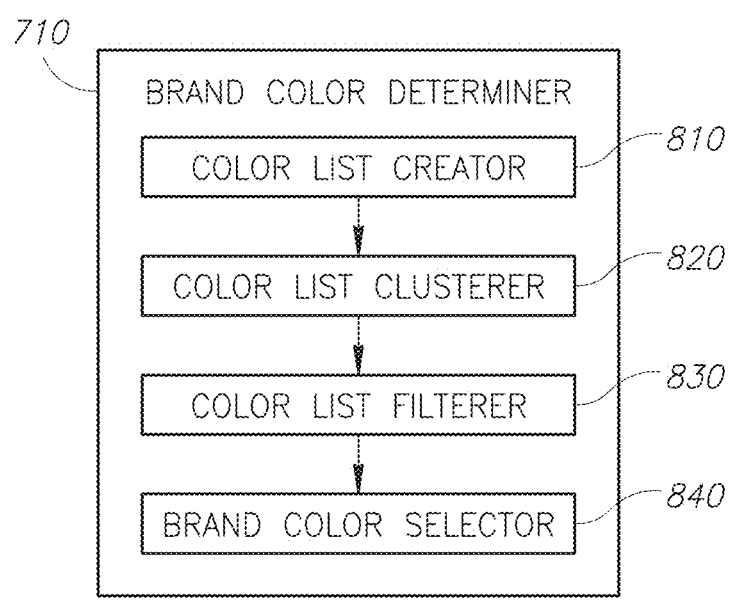
FIG. 7 is a schematic illustration of brand color determiner.

FIG. 7, to which reference is now made, specifies in more detail the structure and functionality of brand color determiner 710 described hereinabove. Brand color determiner 710 comprises a color list creator 810, a color list clusterer 820, a color list filterer 830 and a brand color selector 840.

Color list creator 810 may extract the website palette and the home page palette and create a cluster of part of the home page colors. The extracted colors form a list of potential brand colors and each is assigned with a certainty score (CS). The extracted colors may be combined to a single list.

Color list creator 810 may extract the global website palette from UDB 120 with all the colors it includes. It may be appreciated that these global colors are rarely changed by the website designer thus these colors may be assigned with a low CS value as it is likely that the designer "inherited" them from an existing website template and didn't change them, and thus these colors do not represent an intentional choice by the designer.

Color list creator 810 may further extract the colors of the website's home page, including all home page components, and sort the colors according to the components they paint. The component type sort procedure may include, for example, navigation and site-wide components such as buttons, titles and menus, and may exclude content fields such as logos and images. The extracted colors are assumed to be specific user-assigned colors (i.e. colors explicitly assigned by the user), and not global website colors, and thus may be assigned with a somewhat higher CS than the global colors.

Color list creator 810 may further use only a part of the homepage to make the color selection more accurate and to improve the result quality. This may be done by creating a screenshot of the homepage and analyzing a specific part of it such as the top half of the page, including the header and the top half of the content. The color pixels of the extracted image may then be clustered according to any color distance metric such as RGB space distance and the like. The resulting color list may be assigned a CS based on the color cluster size, i.e. assign a high CS to cluster colors that are present in many pixels.

Color list creator 810 may also employ additional methods, relying on factors such as component counting, component counting by class, most important components, component editing history as stored in UDB 120, e.g. give a higher CS to colors explicitly selected by the designer rather than being defined by the site's template, etc. The merged list may include the full list of potential colors extracted by the different methods described hereinabove and the CS assigned to each color.

Color list clusterer 820 may cluster the colors on the merged list. The cluster procedure may include uniting multiple entries for the same or similar colors based on a color distance metric, replacing multi-color clusters by a representative color value and combining the CS s of the cluster component, to create a merged list of representative colors (each representing a single selected color or selected cluster). The clustering procedure may use any available clustering algorithm.

Color list falterer 830 may filter the merged list and remove bad colors to ensure that the selected brand color may provide sufficient contrast to white and black text being written on top of it. Bad colors may be defined as either too dark or too light according to a predefined minimal and maximal threshold values on the color's lightness, in the HSL (Hue/Saturation/Lightness) color space, or perceived brightness, as described in patent application publication US 2014-0237429, published Aug. 21, 2014, now issued as U.S. Pat. No. 9,513,711 on Dec. 6, 2016 and assigned to the common assignee of the present application. Bad colors may also be low saturation colors in the HSL color space as brand colors tend to be saturated, except in the case of a black and white website where no high saturation colors are available in the list.

Brand color selector 840 may select a predefined number of colors from the list. The selected colors may be those with the highest CS and the maximal diversity, e.g. the color distance metric between them is high. The color selection process may be done, for example, by first selecting the color with the highest CS. Then repeatedly selecting high CS colors whose distance from previously selected colors is higher than a predefined value so as to select high CS colors which provide good color diversity. If the final number of colors is not sufficient (i.e. not enough options for the user to select from), the predefined value may be reduced and the procedure is repeated until sufficient colors are selected.

Brand color selector 840 may use any other algorithm for color selection based on a combination of quality and diversity of the colors in the list as described in the patent application publication no. US 2015-0310124 published Oct. 29, 2015, now issued as U.S. Pat. No. 9,747,258 on Aug. 29, 2017, and assigned to the common assignee of the present application, where the CS value is used as the quality value used by those algorithms.

Brand color determiner 710 may alternatively identify a logo image component based on semantic characteristics, extract the leading colors of the logo, select the dominant color which is the brand color with highest certainty, and define this color as the brand color. The other brand colors may be used when more than one actual brand color is needed (i.e. not a color and its complementary colors).

In one embodiment of the present invention, the assignment of the additional colors to components by color assigner 720 may be performed based on a method called color adjacency graph (CAG) implemented by CAG analyzer 725 as further detailed below.

Color assigner 720 may assign colors to the different screens and components of the created app. Every layout may have a different number of colors. Some colors may be controlled and set by a designer, while others may be automatically calculated. The externally controllable colors may first automatically derive from the brand colors determined by brand color determiner 710 or may be set manually by the designer. The number of controllable colors in each screen may differ. One layout for a product gallery may have 3 controllable colors, while a different layout may have 5 controllable colors. The designer of a layout such as the unique product gallery may determine the number of controllable colors, and their assignment to the layout elements. The layout may also include fixed colors assignment, i.e. some elements in the layout may have fixed predefined colors that cannot be modified.

In the product gallery example, the system may assign brand colors to the product title color, to the product price color and to a ribbon saying whether there is a sale or not. Color assigner 720 may automatically select additional colors using any suitable algorithm for the remaining elements of the product gallery.

Color assigner 720 may automatically create a CAG for each layout based on the analysis of the displayed elements in the layout and their topological relationship (including their touching or overlap status). The CAG may be created separately for each displayed element such as widget or component in each screen or at the entire screen level. The CAG may describe the relationships between the colors used in the layout and the dependencies between these colors.

A node in the CAG may represent a single color assignment, which may still apply to multiple visual regions in the layout. For example, a single color assigned as background to many text elements in the layout would be mapped to a single node in the CAG.

An edge in the CAG may connect a pair of nodes, and may represent a relationship or constraint related to the way the colors, assigned to the nodes, interact.

Figure 8:
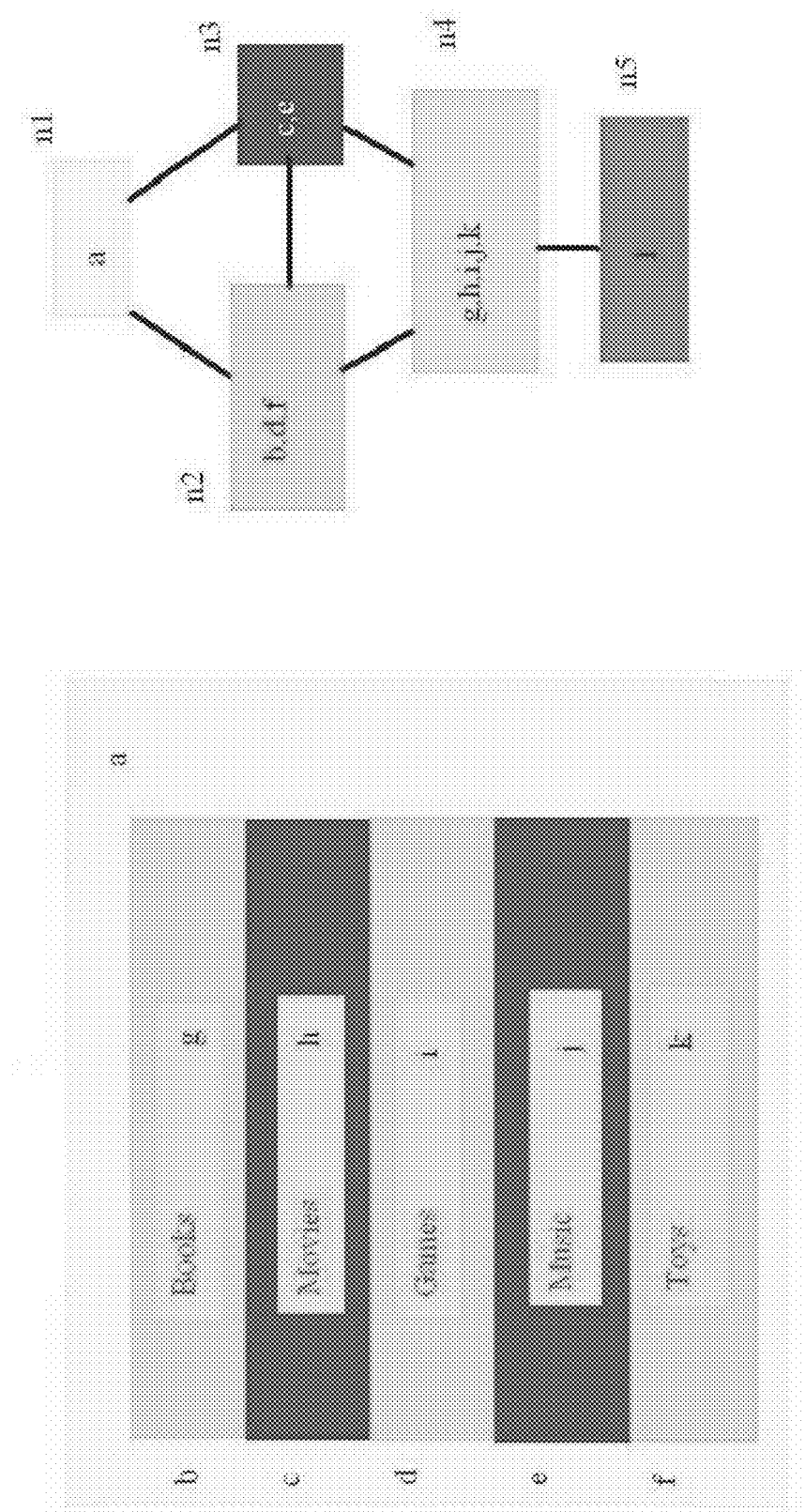
FIGS. 8, 9 and 10 are schematic illustrations of an exemplary e-shop category selection layout, the corresponding CAG created by color assigner, and the layout's sub-element tree.
Figure 9:
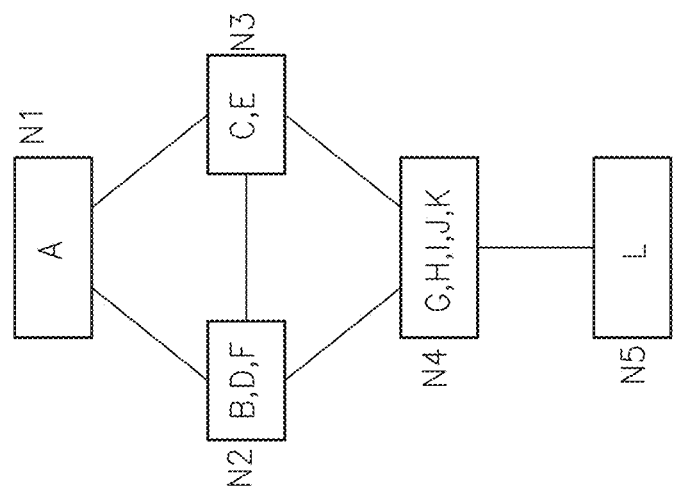
Figure 9:
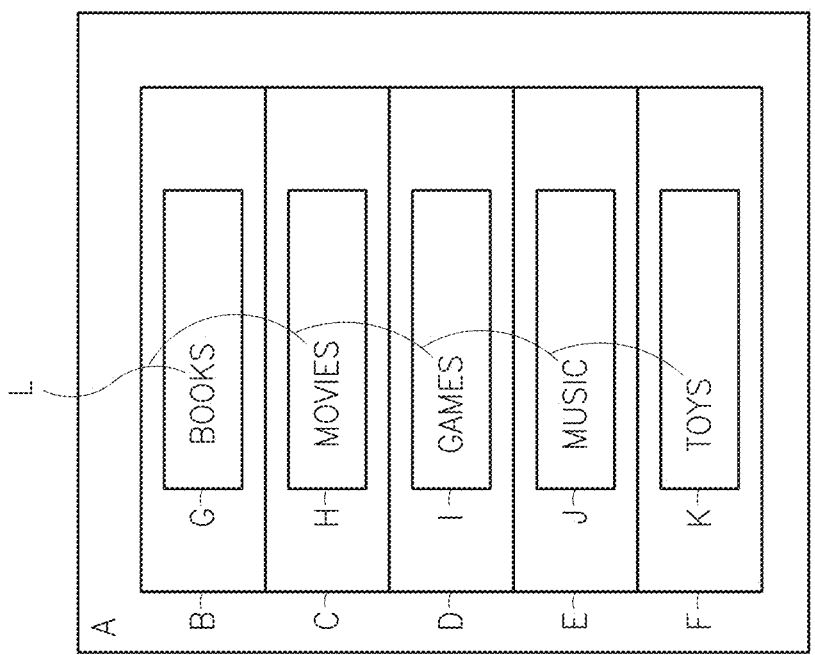
Figure 10:
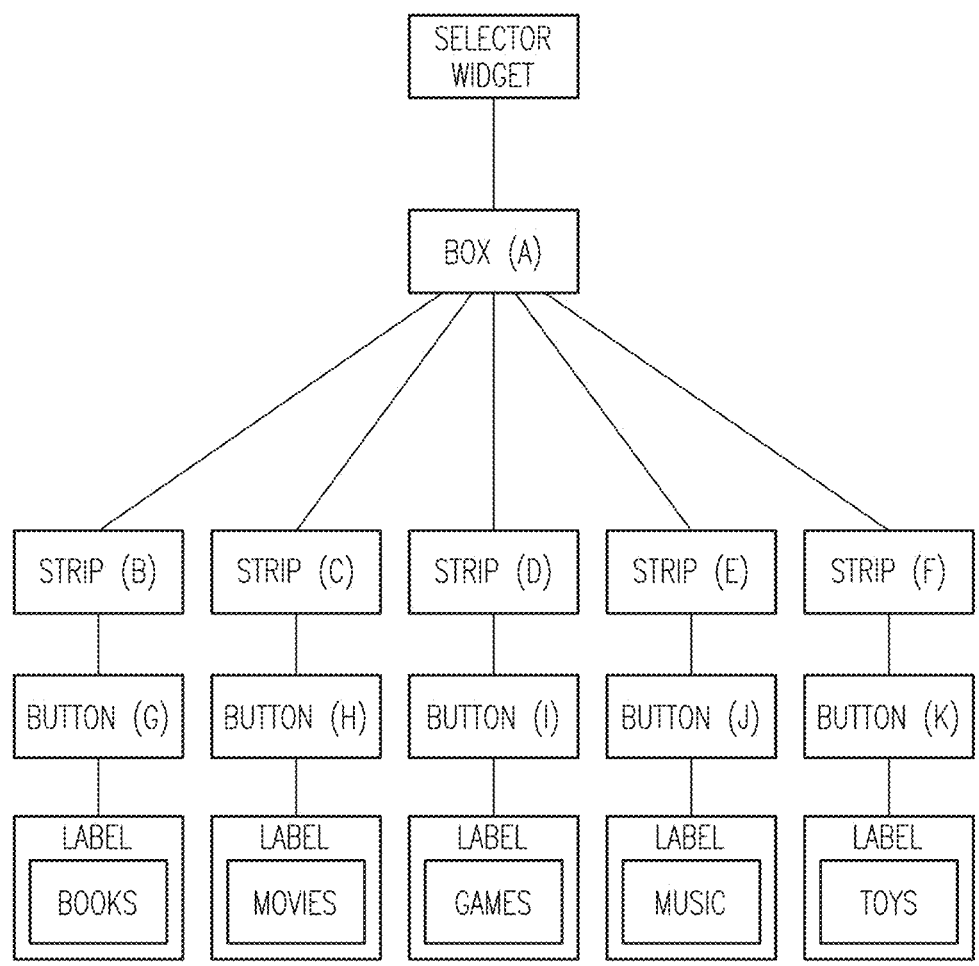

FIGS. 8, 9 and 10, to which reference is now made illustrates an exemplary e-shop category selection layout and the corresponding CAG created by color assigner 720.

Widget A includes a frame "a" with a specific color, five stripes b, c, d, e, and f, using two colors interchangeably. Five buttons, sharing the same color, g, h, i, j, and k are located one on each stripe, and five text labels, sharing the same color, (books, movies, games, music and toys) are located each on a button.

Color assigner 720 may create a corresponding CAG that may include five nodes, one node for each color present in the layout. Each node in the CAG, n1, n2, n3, n4 and n5 represents a different color assignment. The different widget elements are attached to the different nodes according to their color assignment, and thus all the buttons, g,h,i,j,k, share the same node in the CAG as they have the same color, The stripes are of two colors so they are distributed between two nodes etc. A constraint such as "colors should be distinct" may be used as an edge in the created CAG and may connect adjacent elements such as frame a and stripes b,d,f. Similarly edges may be added in the CAG to add constraints between the different elements. It should be clarified that each node in the CAG represents a color assignment rather than an actual color. Thus, for example, node N1 (representing the color of A—the outer frame) and node N4 (representing the color of the five buttons g,h,i,j,k) represent different color assignments, but may still use the same color—as they do not touch each other in the widget.

It may be appreciated that more than one edge may connect the same two nodes in the CAG as there may be multiple relationships or constraints between the two nodes.

The CAG may also include node-level constraints which are specific constraints related to nodes (rather than to edges), such as the minimal or maximal lightness constraint as discussed hereinbelow.

For example, one color, used for background, may appear behind another color used for foreground text. The CAG may include an edge-constraint between the relevant nodes, so that the foreground color needs to be far from the background color in terms of HSL (Hue/Saturation /Lightness color model) lightness, perceived brightness or color contrast. Another constraint may be that these two colors should be complementary.

For example, in a product screen there may be two buttons per product: an "add to cart" button and a "see details" button. These two buttons may appear right next to each other so they should look good together. There may be various additional constraints that may originate from this relationship. For example, the colors should be different enough that the buttons are distinguishable and the like.

Another example is text that appears over user-controlled or user-provided images, like a product image. To make the text readable, color assigner 720 may add a dark overlay above the image and behind the text. This modification to the image may introduce a node constraint that the text color for this image should be light enough to be readable over the dark overlay.

The CAG can be regarded as a dependency graph or constraint graph applicable to color assignments in the specific layout in the generated app. Once defined, the system may use the CAG to choose the colors for elements of the layout automatically, or to alter aspects, like specific color lightness, from what the user chooses in order to make the color assignment fit the CAG's constraints. The choice of some of the colors may also be dictated by the brand or dominant colors selected, and the system may use the CAG to assign the remaining colors, e.g. converting it to a set of constraint equations and using a relevant solver algorithm.

In an alternative embodiment of color assigner 720, the designer may choose a set of colors, regardless of their location in the app screens, to be used as a basis for a set of automatically generated color assignment for the layout. Color assigner 720 may generate additional color variations, and may assign the complete set of colors (base+variations) to the CAG's nodes while satisfying the constraints defined in the CAG.

As an example, the user may choose orange and purple as base colors. Color assigner 720 may generate a set of color variations, including very light orange background, dark purple text and a purple button with white text on it, that may solve the set of constraints embodied in the CAG. Color assigner 720 may have a repository of predefined text buttons, and other elements, having good aesthetics, and color assigner 720 may use their color combinations when generating possible color solutions.

It may be appreciated that that the CAG of an app and the CAG of the corresponding website may be different as well as the screens, widgets, layouts, workflows and the like described hereinabove. Color assigner 720 may use CAG analyzer 725 to specify colors to the app elements using a combination of pre-defined colors, brand color, user assigned and calculated colors. The created app may give a similar look and feel to the corresponding website, even though it may use a different set of layouts.

It may be appreciated that the layout of the website and the app may be different. Moreover, a separate CAG is created for each screen, even to identical screens, and different CAG solutions may be provided to identical CAGs representing different screens as there may be more than one color assignment that satisfies all the CAG constraints, In yet another embodiment of the present invention, color assigner 720 may use a set of predefined, professionally designed color palettes. The designer may use the palettes to change the look and feel of the entire app in one click without actually choosing each and every color.

It may be appreciated that typically designers may find it very important to use the exact brand color, which fits the user's brand, in the web site and in the corresponding app, but the assignment of the additional colors is less crucial and may vary.

The designer may manually choose brand color in color assigner 720 and the rest of the colors may be taken from the predefined palettes. The definition of each layout in the system may include the color assignment for each element of the layout, e.g. for a specific product page layout, the color for all the heading background should come from the brand color, the color for all text fields should be a specific color of the palette while the color for the price and "on sale" badge should be another color of the palette etc. A different product page layout may have a different definition.

The predefined color palettes embodiment of color assigner 720 may enable the designer to define a single palette per screen. For example, color assigner 720 may provide two palettes: one called SPRING, and includes a list of 10 pastel colors, and the other called METAL, and includes a list of 10 dark colors. The designer may choose a single palette, either SPRING or METAL, for each individual screen but not both.

Assume the user has selected the SPRING palette, and decided to apply the SPRING palette to the entire app— meaning to all of its screens. When color assigner 720 assigns colors from the SPRING palette to all layouts, the assignments will always be from SPRING's list of 10 colors, but the slot selections, i.e. the position of the color in the palette might differ. It might be that for a specific layout using the SPRING palette color assigner 720 may use the third and fourth slots, i.e. the colors in the $3^{rd}$ and $4^{th}$ positions in the palette, but using the METAL palette for the same layout, color assigner 720 may use other slots such as the first and the last. For another layout the assignments may be different.

Whenever a new layout is created, color assigner 720 may choose a color assignment that may be applicable to all available palettes. In this embodiment, color assigner 720 may provide pre-made specialized palettes to provide an optimized user experience.

The designer may choose any pre-made palette provided by color assigner 720 to easily change the entire look and feel of the app.

However, as a general rule, the user may ultimately decide to override any constraint defined by color assigner 720 and choose clashing colors. Color assigner 720 may suggest and steer the designer in a good direction but may not force a specific solution on the designer. In the case where the designer selected colors that do not comply with the CAG constraints the layout may still look good as the brand color may be applied to one section of the screen and the palette to a different section which causes (clashing) colors to be next to each other but not on top of each other. In such a case the clashing colors would create a display which is non-aesthetic, but may still be functional and readable.

In some the resultant layout may still contain a hard constraint, for example, having the brand color as a background color and the palette color as a foreground color. In these cases color assigner 720 may try to warn the user about the problem or suggest an alternative, however, this is normally not the case, and color assigner 720 may typically choose to apply the brand color in locations where no such constraints exist.

Figure 11:
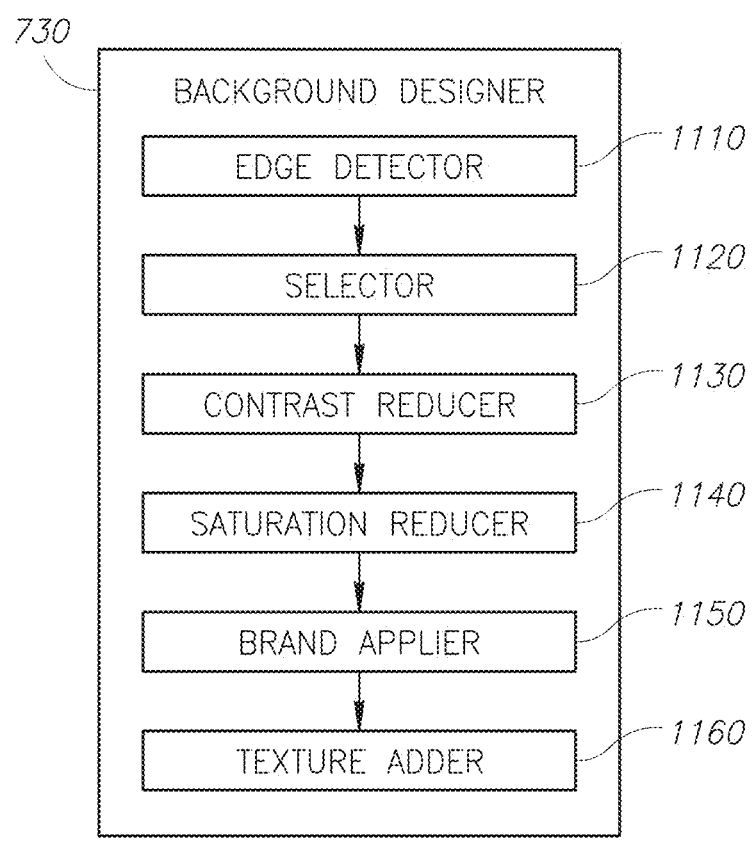
FIG. 11 is a schematic illustration of background designer.
Figure 12A:
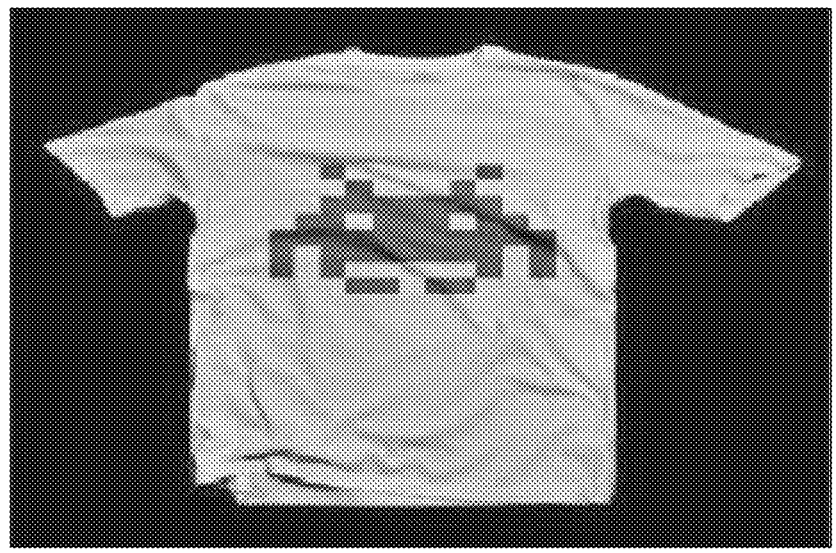
FIGS. 12A and 12B are examples of a source image and a background image created from that source.
Figure 12B:
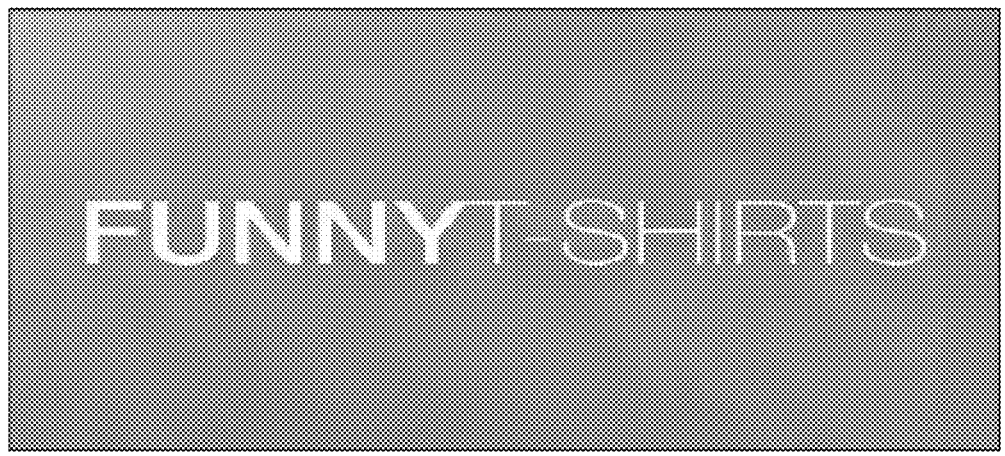

FIG. 11, to which reference is now made, specifies in more detail the structure and functionality of background designer 730, described hereinabove Background designer 730 comprises an edge detector 1110, a selector 1120, a contrast reducer 1130, a saturation reducer 1140, a brand applier 1150 and a texture adder 1160. Background designer 730 may create a background image like the image in FIG. 12B from a given source image like image in FIG. 12A.

As the images of products used in a website were not designed to be used as background in an app, their straight forward use as background images may not result in a satisfactory background as the image may suffer from high contrast, detail overload, white and black parts or other characteristics which may make the text unreadable over them. In addition the whole images may be unsuitable for use as background because of its content or subject.

Background designer 730 may create a background from an "interesting" part of an image used in the website. An "interesting" part may be a small part of the image capturing a transition between objects in the image.

Edge detector 1110 may use an edge detection algorithm to detect the image edges. Edges are typically in the transition between a "busy" and a "not busy" part of the image and are perceived as good candidates for being used as background. For example, if the relevant image contains a bottle, edge detector 1110 may detect the bottle's contours to be used as a background.

Selector 1120 may zoom and clip an area containing some of the detected edges of image A, selecting the area (for example) based on concentration of edges.

Contrast reducer 1130 may reduce the image contrast, using any contrast adjustment algorithm known in the art.

Saturation reducer 1140 may reduce the image saturation to a near gray scale low saturation image, e.g. by reducing the S (Saturation) component of the image's HSL color model representation.

Brand applier 1150 may select one of the brand colors detected by brand color determiner 710 and use it to create an image with a gradient between the brand color and another complementary derived color, usually the brand color with the HSL hue component changed to some extent. The gradient may be defined from more than one color and a complementary color. The hue change definition (e.g. +20 or +80 degrees in HSL representation) is also a layout preset value—with a higher hue change value providing a more colorful look. The gradient definition (e.g. left to right) may also be used by the layout.

Brand applier 1150 may combine the created gradient with the low saturated image provided by saturation reducer 1140. The combination may be performed using any layer combination blend algorithm. One of the recommended algorithms is the soft light algorithm, described in <https://en.wikipedia.org/wiki/Blend_modes#Soft_Light>

Texture adder 1160 may add a randomly selected texture to the image. The texture may be selected from a set of ready-made texture-only images, i.e. gray scale images of textures. The texture may be added using any appropriate blend mode. One of the recommended blending algorithms is described in <https://en.wikipedia.org/wiki/Blend_modes#Multiply>.

It may be appreciated that the background, including the colors and text, may be modified at any time by the designer using app editor 350.

As already mentioned hereinabove, computer 150 may access AGWBS 100 as a designer of a web site, as a designer of an app or as an end user of a hosted website.

When computer 150 (used by designer 151) accesses AGWBS 100 from a browser, it activates a WBS client 1500 on computer 150.

Figure 13:
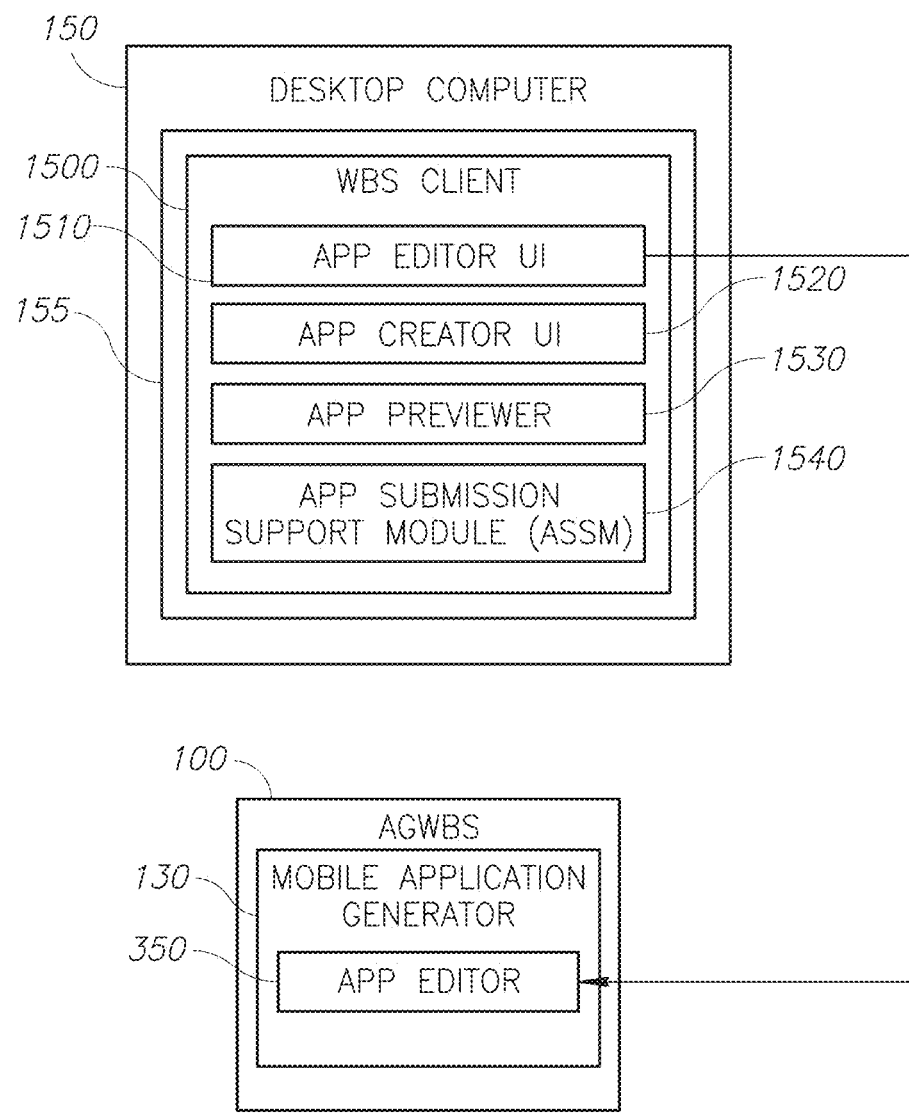
FIG. 13 is a schematic illustration of a WBS client and some corresponding WBS server elements.

FIG. 13, to which reference is now made, illustrates a WBS client 1500 that comprises an app editor UI 1510, an app creator UI 1520, an app previewer 1530, and an app submission support module (ASSM) 1540. App editor UI 1510, app creator UI 1520 and app previewer 1530 typically run within a local browser 155, though in some embodiments some or all of these elements may run outside of browser 155, e.g. consist of a pre-installed desktop applications.

App editor UI 1510 is the client side user interface of app editor 350 used by the designer to edit the apps created by AGWBS 100 during their lifetime. App editor UI 1510 may be used any time to connect to mobile application generator 130 and edit the app. It can be done before the application is published and afterwards. App editor UI 1510 may provide multiple editing solutions and user interfaces, each providing a different level of customization and editing capabilities to cater to the different designers having different ability or desire to invest in app customization and editing, as selected by app editor 150. It should be noted that different embodiments of AGWBS 100 may implement different methods of dividing the functionality between the client (app editor UI 1510) and the server (app editor 350). In some embodiments most functionality may be implemented in the client side, some on the server side and some may be divided in some manner between the client and the server.

App editor UI 1510 may typically let designers choose a layout by previewing layouts one by one which the designer may skip until he may find one he may like. The designer may thus be exposed to a small subset of layouts from all those available, and app editor UI 1510 may display the most appropriate ones first.

Different designers may spend different amounts of time and efforts in controlling and customizing their app. Designers may be categorized according to their engagement and willingness to invest in editing the app and the engagement category may be used by app editor 350 to determine the level of editing capabilities and choices provided to the designer in the editor. The engagement level of the designer may be determined by app editor 350 according to the collected BI information stored in UDB 120 reflecting previous designer activities, as well as evaluation of the work products generated by the designer (also stored in UDB 120).

Such analysis may be performed by app editor 350 by employing a classifier system using (for example) machine learning technologies and using the UDB 120 information. Thus, app editor 350 may determine a designer CCC score based on the designer's level and engagement, and based in particular on the CCC score assigned to layouts used by the specific designer.

Prior art systems provide two working modes, a "simple" mode and an "advanced" mode, from which the designer can choose one. App editor 350 may determine the type of editor UI to provide to a designer according to the BI information collected about him, so that the user's category may control the level of complexity exposed by app editor UI 1510.

App editor UI 1510 may provide "low" mode editor for designer categorized with very low engagement. Such designers may invest as little time as possible with the editor, and may be quickly satisfied with the resulting application, mostly created automatically by app generator 130. Such designer may abandon AGWBS 100 if the automatic resulting app is not satisfactory. For example, these may be users who may be willing to invest up to 10 clicks (or 10 interactions) with the editor.

App editor UI 1510 may provide an "intermediate" mode editor for designer categorized with medium engagement. Such designers may be willing to invest time, and may expect more flexibility and customizability from the editor, but not too much. These editors may highly invest in the website building process and may like to reap the benefits in the app building process. For example, these may be users who may be willing to invest up to 50 clicks (or 50 interactions) with the editor. The actual interaction number for each editing mode may be configurable.

App editor UI 1510 may provide an "advanced" mode editor for designer categorized with high engagement. Such designers may be professional designers and may invest a lot of time in the editor. They may be willing to learn all the editor settings and may expect a high level of customizability to reach their required level of control. These may be users who may be willing to invest more clicks than the other group.

App editor UI 1510 may provide different layouts to the different editor modes. Some layouts may be simple to use and may have few settings, and some layouts may be very complex and may expose many more settings. App editor 350 may assign the level of complexity according to the designer category which may be determined either using the BI information stored in UDB 120 or by offering several layouts and letting the designer choose between them.

The analyzed BI information may be past actual engagement level of the designer as reflected in session lengths, number of saves, number of interactions, actual usage of advanced settings, features used and the like. The offering tactic may be to initially provide 3 possible layouts for every screen, one in each complexity level, i.e. one simple layout for the "simple" mode, one medium layout for the "intermediate" mode and one complex layout for the "advanced" mode. The editor mode may be determined according to the selected layouts and their actual usage pattern and statistics. The designer category, including his proficiency and engagement level may be updated according to the selected editor mode and may be stored in UDB 120 and used in other editing sessions of the same designer.

App editor UI 1510 in its "simple" mode may provide an editing method suitable for designers who may want a rudimentary level of customization. This editing method may be most suitable for editing apps having a relatively small number of screens, often 5-6 distinct screens, where each screen may be typically based on a single main widget. For example, an e-shop app may consist of a category selector screen; a product selector screen; a product details screen; a shopping cart screen and a checkout screen. The designer may go over the screens, and may switch between different alternative widgets for the selected screen, which may all present the same data. For example, in a product gallery screen, the designer may be able to switch between different gallery types.

Figure 14:
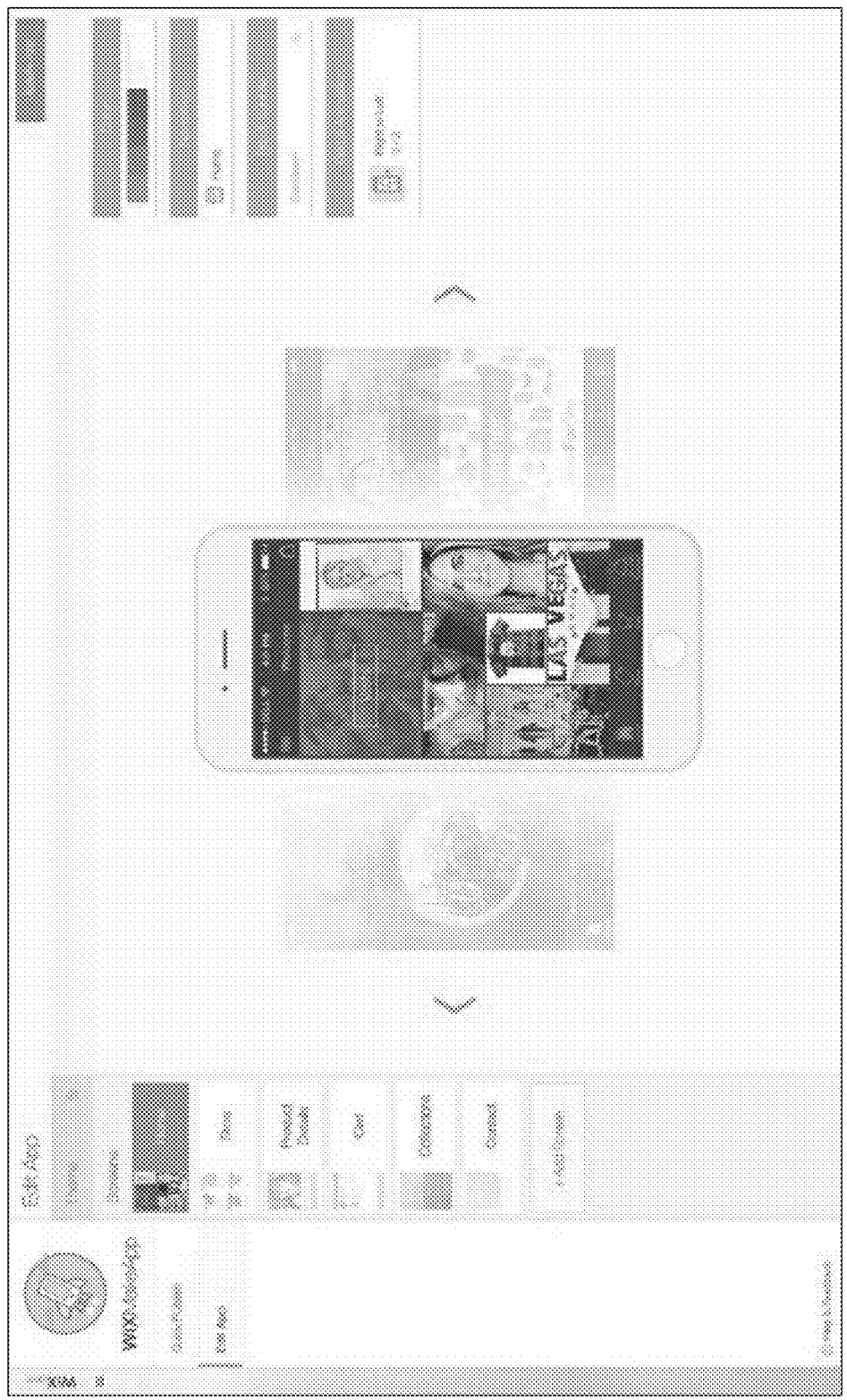
FIGS. 14 and 15 are screenshots of an example web user interface pages used for selecting layouts for the created app.
Figure 15:
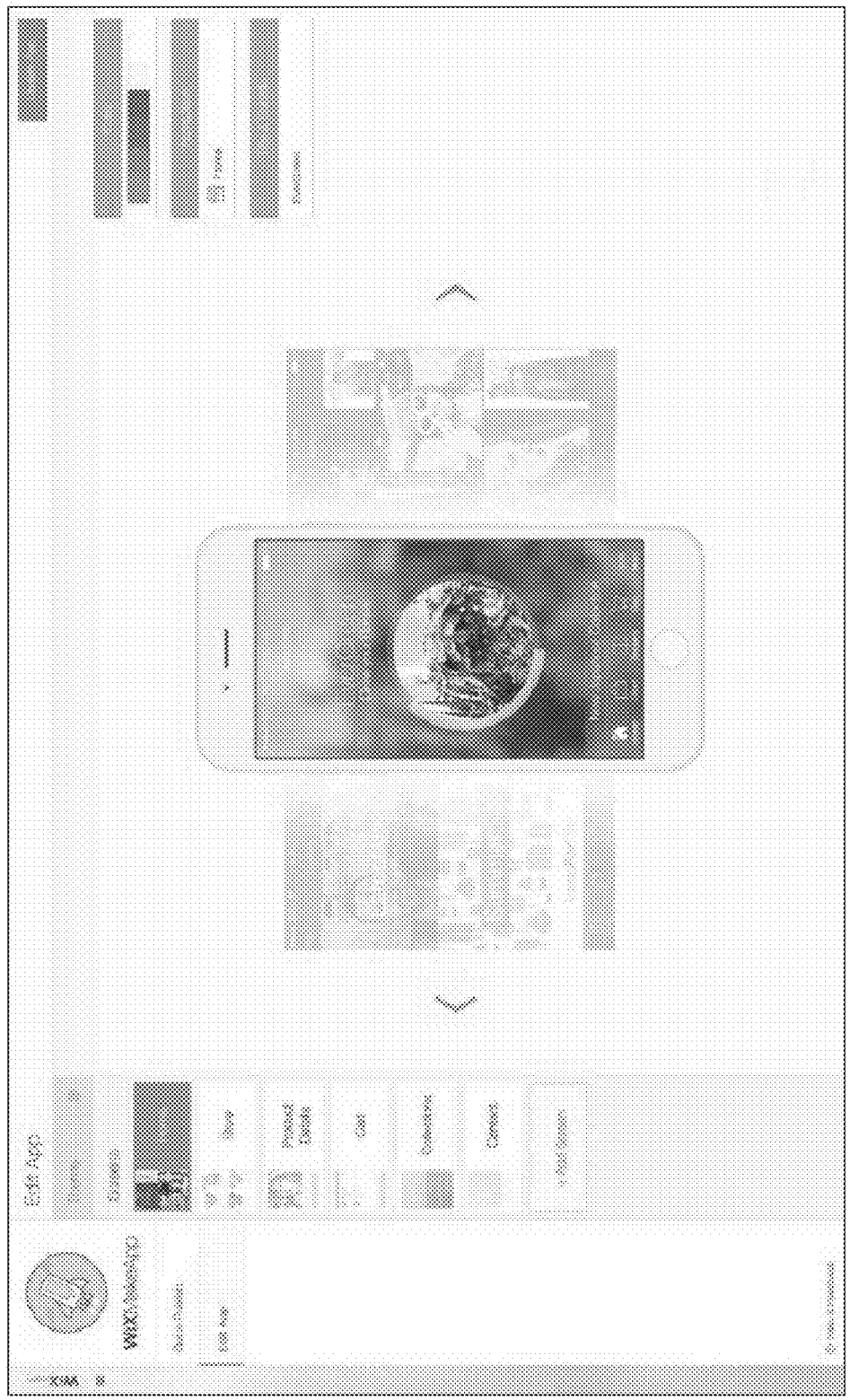

FIG. 14 and FIG. 15 illustrate together a user interface that may be used to quickly switch between different versions of a screen, using the app home screen as an example. All the possible layout options for the screen may be present in app editor UI 1510 and the designer may navigate between the possible layout options using the left and right arrows.

App editor UI 1510 may offer in the "intermediate" mode a limited number of widget options for each screen, and may change the offered options according to various parameters, such as the designer profile stored in UDB 120, the designer preferences, the amount of data in the associated back-end databases inside website ODB 125, previous interactions with the same designer and the like.

For the more advanced designers, app editor UI 1510 may offer in the "advanced" mode, additional extensive editing and customization capabilities including access to additional alternative widgets; access to widget layout and customization options; color modification options, theme and layout setting; creation of new screens based on pages from other websites; modification of sub-element layout in complex widgets, e.g. change their order, size and position and the like.

Figure 16:
FIG. 16 is a screenshot of an example web user interface page used for customization of the created app screens.

FIG. 16 illustrates the user interface for customization of an advanced grid layout (which supports animated appearance of specific grid cells) for a specific screen, including customization of the direction from which animated cells appear and the type of animation used for appearing cells.

The system may store in UDB 120 the history of the selected layouts for each screen and the tags associated with them. This information may presumably reflect the preferences and interests of the designer.

When selecting layouts to be offered to a designer for a specific screen, and determining the order in which the layouts would appear in the selection UI, app editor UI 1510 may select layouts based on their tags, offering a layout with a tag similar to tags attached to other screens selected layouts. App editor UI 1510 may assign weight information to tags such that some tags may be more important than others or convert tags to points in a multi-dimensional space to enable converting the layout matching problem to a geometric metric optimization problem.

App editor UI 1510 may perform clustering analysis on tags in order to detect proximity to located tag clusters, or add different tag priorities to distinguish between tags used previously in the same screen, tags used in different screens of the same app or used in other apps by the same designer.

It may be appreciated that AGWBS 100 may also assign the same or similar tags to various design options used in the website to be converted. App editor UI 1510 may use the same tags used or assigned by app editor 350 for selecting the layouts to offer to the designer.

App editor UI 1510 may select layouts according to their CCC score to match the CCC score of the designer. The CCC score of a layout may be based on the number of configurable properties in the layout and the CCC score of the designer may be based on his usage statistics such as the layouts he has chosen so far, his engagement level with the editor, number of save operations he made and the like. App editor UI 1510 may suggest layouts whose CCC score has a high degree of correlation to the designer CCC which may result in providing different user experience to different types of editor with regards to app editor UI 1510.

Once the editing is completed the designer may save the edited app and re-generate the XACF. The modified XACF may then be distributed as an update to the app as further described hereinbelow.

App creator UI 1520 may be activated in the context of a specific website creation environment. It may initiate the app creation process when invoked from the WBS client 1500. App creator UI 1520 may activate mobile application generator 130 that may create the corresponding app.

App previewer 1530 may display a preview version of the created app. The designer may use app editor 350 through app editor UI 1510 to modify the created application, typically after performing a preview session. App previewer 1530 may provide a preview version of an app for multiple mobile operating systems, device types and versions. It may be appreciated that native mobile device code cannot be executed in the browser on the computer 150. In addition, specified mobile device related capabilities such as reading the value of a sensor such as GPS, velocity and the like may not function in the web browser where WBS client 1500 is activated thus may not be activated during the preview session of app previewer 1530.

Prior art systems may solve the inability to access built-in capabilities of a mobile device by accessing one of the available smartphone software simulation services on the cloud. Such services may be provided by $3^{rd}$ party suppliers, such as "app.io" and "appetize.io", providing connectivity through the Internet with a server cloud providing app running services for a given target platform. The simulation server may transmit the simulated mobile device display using video streaming, or any other suitable technology.

Other prior art systems may provide the capability to run submitted software on actual mobile device farms connected to cloud servers. An example of such system is Amazon's device farm, located at <http://aws.amazon.com/device-farm>. Such systems may provide better performance than software simulation on regular servers, but may be limited to the specific set of mobile device available through the service, and may require the use of specific testing frameworks in order to connect to the devices and run the actual simulations on the devices.

Figure 17A:
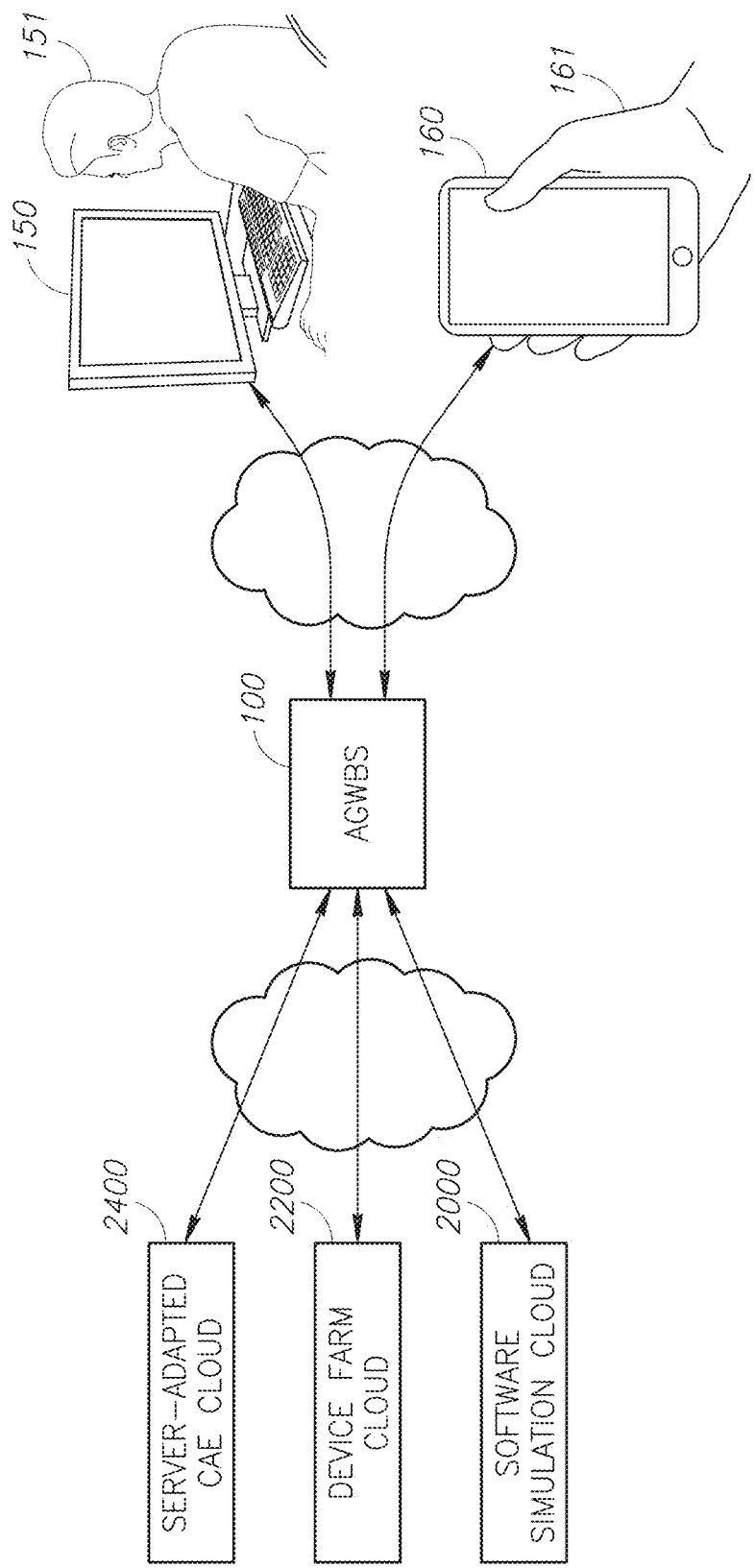
FIGS. 17A, 17B, 17C and 17D are schematic illustrations of the different provided app simulation services.

Reference is now made to FIGS. 17A, which illustrates the simulation opportunities for AGWBS 100, to 17B and 17C which illustrate the two known configurations described above and to FIG. 17D, which illustrates a server-adapted CAE simulation cloud, constructed and operative in accordance with a preferred embodiment of the present invention.

In FIG. 17A, AGWBS 100 may provide simulation and preview services to users 151, 161 by employing a software simulation cloud 2000, a device farm cloud 2200 or a server-adapted CAE cloud 2400 (further described below). It should be noted that user 161 may be able to run a preview version of the desired mobile app in some manner on his mobile device 160. However, user 161 may want to preview a version of the app for a mobile device different than his mobile device 160, and would thus still be required to use a cloud-based simulation service through AGWBS 100.

Figure 17B:
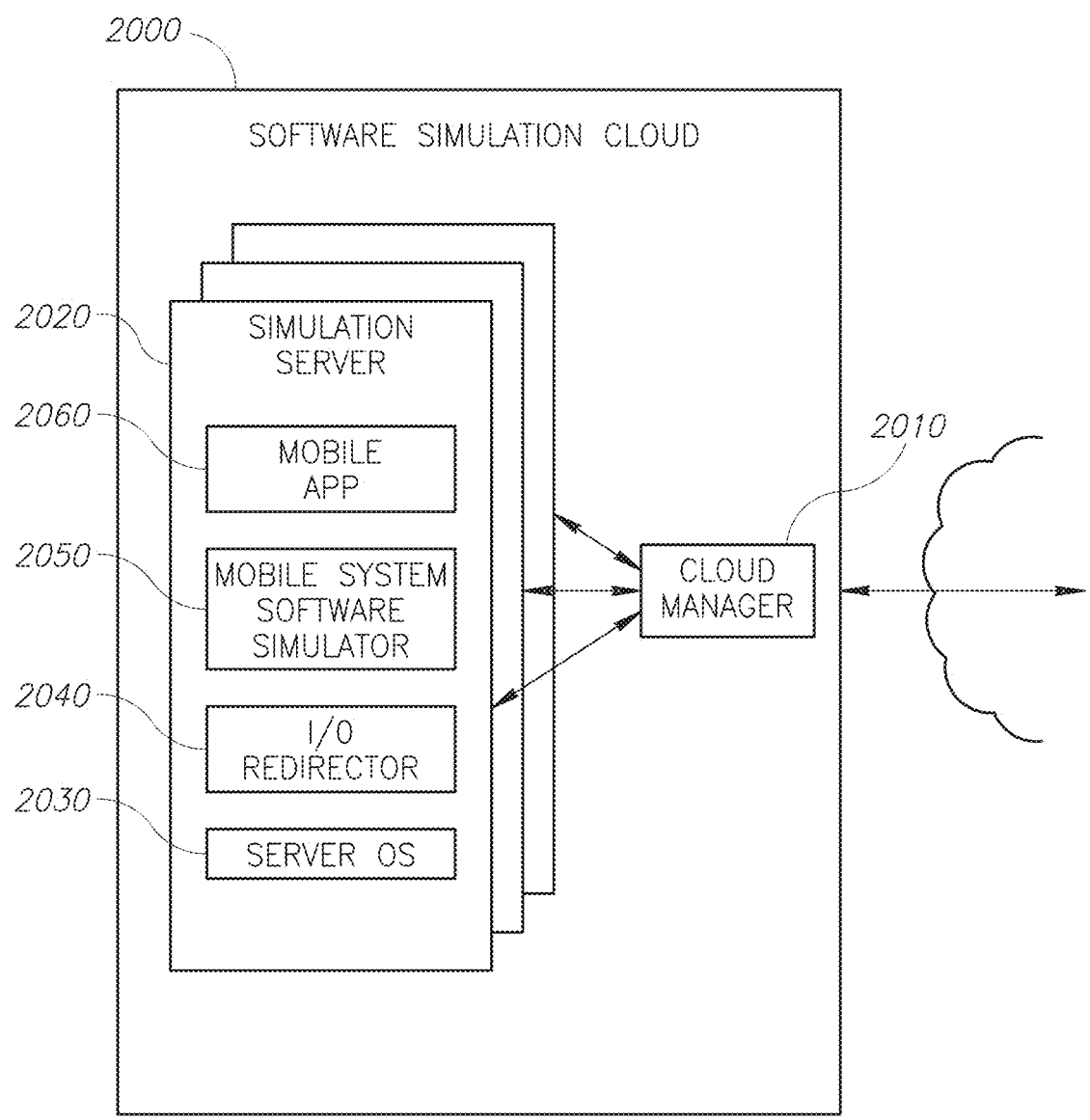

In FIG. 17B, a sample implementation of software simulation cloud 2000 is shown, comprising of multiple simulation servers 2020 and cloud manager 2010 which may coordinate the multiple simulation servers 2020 and provide services such as session management, load balancing and failure recovery. Each simulation server 2020 may be comprised of server OS 2030, I/O redirector 2040, mobile system software simulator 2050 and mobile app 2060. I/O redirector 2040 may provide the necessary routing of input/output between the simulated mobile device and the user's device 150/160 (through AGWBS 100). Mobile system software simulator 2050 may provide the necessary software simulation of the mobile device hardware and the mobile OS so that mobile app 2060 can function on simulation server 2020.

Figure 17C:
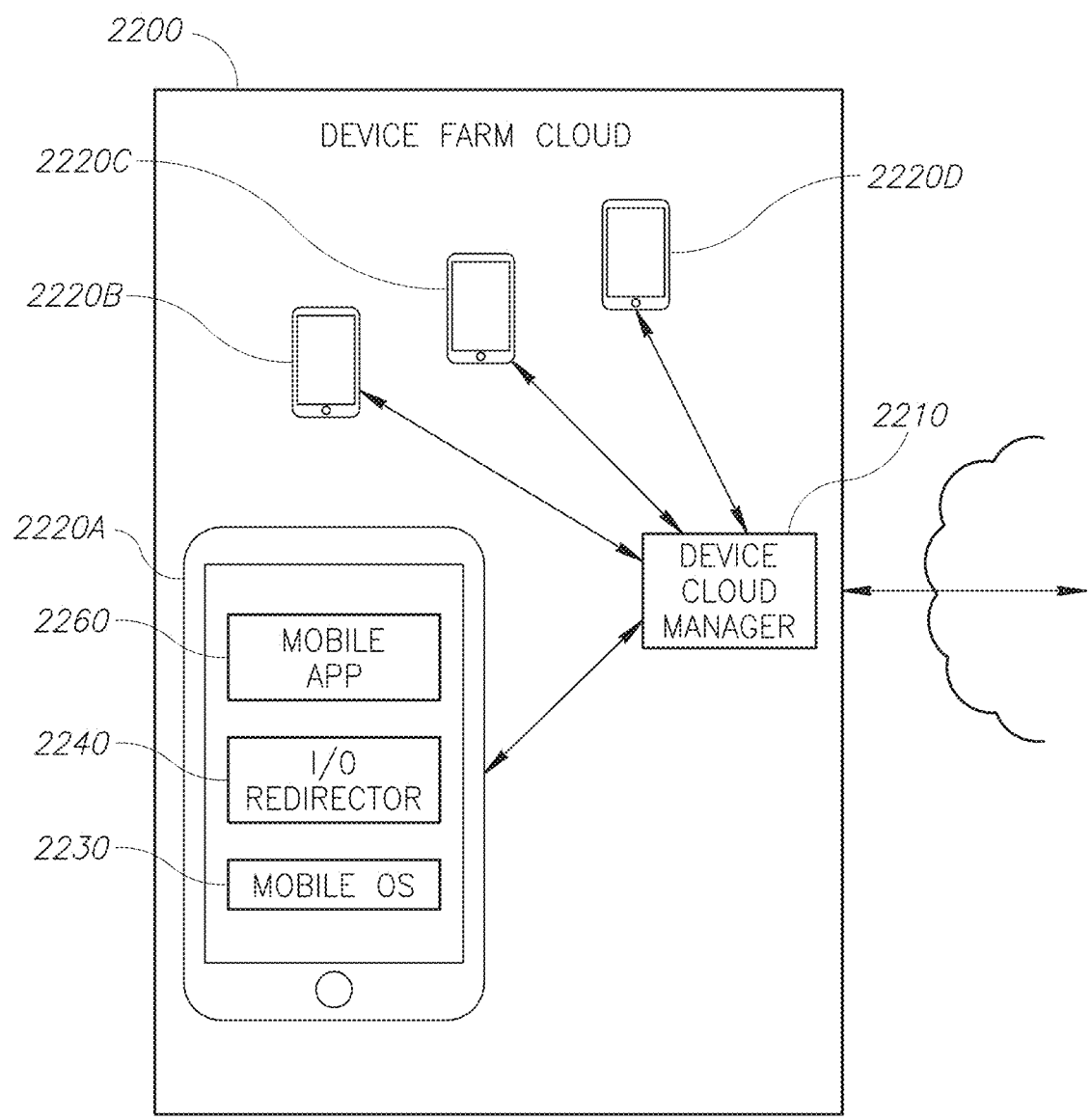

In FIG. 17C, a sample implementation of device farm cloud 2200 is shown, comprising of multiple mobile devices 2220A, 2220B, 2220C, 2220D (which may be different from each other) and device cloud manager 2210 which may connect to and coordinate the multiple mobile devices 2220A to 2220D. Each mobile device 2220 may be comprised of Mobile OS 2230, I/O redirector 2240 and mobile app 2260. I/O redirector 2240 may provide the necessary routing input/output between the mobile device 2220 and the user's device 150/160 (through AGWBS 100)—so that mobile device 2220 interacts with the remote user rather than its local I/O means (such as its touch screen).

Applicants have realized that these solutions may not be scalable and may be very costly, as the simulation services may be required to provide a dedicated simulator to every app designer. In addition, simulators typically may use software simulation (such as mobile system software simulator 2050 above) which may be 50 times slower than the actual run time of an app on a mobile device. The performance issue of the simulators may be particularly notable with mobile devices using Android OS, as these mobile devices may be equipped with ARM processors, while the software based simulators may typically run on non-ARM processors, such as the x86 processors used in server farms, and the simulation software is required to "bridge" the difference in the architecture and underlying processor.

Additional issues with remote simulators may be bandwidth limitations, and functionality limitations that may affect the preview result. Network bandwidth limitations may result in low resolution preview and delays in response to human interaction with the app being simulated. Functionality limitations may arise when specific app functionality may not be really performed in the simulation environment such as payment transactions, and that may result in screens that may never be reached in the simulation such as payment success or fail screens.

Website conversion system 10 may provide several options for app previewing on the designer's computer 150 through a variety of methods (or combinations thereof) as further detailed below. Some of these methods may use cloud-based simulation servers as noted above (albeit with a modified or subset app), and some of them involve running the app or a version thereof on the computer 150 or on a mobile device 160. The system may provide multiple methods to perform app previewing, so as to allow the app designer the flexibility in previewing versions of the app on his desktop or mobile device, and to preview versions of the app adapted to multiple mobile devices and OS version, without requiring the designer to own multiple mobile devices.

App previewer 1530 may provide app preview based on remote servers accessed through the cloud (with app previewer 1530 acting as I/O front-end to the remote simulation servers) or based on client side rendering. The cloud based preview may include software emulation of mobile operating system running on server farm on the cloud, a server farm running the same hardware and software used by mobile devices, or real mobile devices connected to servers on the cloud capable of capturing screen shots of the running application and sending the screenshots. Client rendering is based on applications capable of rendering graphics in browsers. All these options may render the entire app screens or a subset of the screens provided by the app, perceived by AGWBS 100 the main app screens.

App previewer 1530 may choose to render the main screens as defined by main screen determiner 405 (and not all of the app screens) using a non-interactive (or limited interactivity) rendering, i.e. the included screens may provide only some (or none) of the interaction options available in their full version. This may allow high-resolution screen rendering to be used while being scalable and avoiding substantial load on the simulation servers (for example by executing a limited version of the app on the simulation servers 2020). App previewer 1530 may be used after each step performed by mobile application generator 130 and may be used after more than one step. It may be used after building the base app by vertical base app builder 320, after vertical mixing by vertical base app mixer 340, after any editing session by vertical base app editor 330 or converted app editor 350 or any combination of any step done by mobile application generator 130.

As described hereinabove, app previewer 1530 may provide a preview of the main screens. If a converted app has, for example, four main screens out of total of nine screens, app previewer 1530 may need to render only these four screens rather than the whole nine comprising the entire converted app. App previewer 1530 may also render screens by running the full app on the simulator while directing it to "go directly" to the specific simulated screen (e.g. by using an added parameter specifying the screen in which the app should start), or by running a limited version of the app, that may render only the specified main screens.

Alternatively, app previewer 1530 may render the app main screens using a client-side rendering method, such as the SVG-based rendering method described hereinbelow instead of using cloud-based simulators as described hereinabove. In one embodiment a Field Content Determiner FCD 415 may set values to fields and objects in a screen. In this case app previewer 1530 may provide actual values to fields in selected screens and render them, with the screen displays based on preliminary app screenshots created using the cloud-based simulator (through the use of a process which creates SVG-based application mock-up based on these screenshots as further described hereinbelow). Such rendering may be made with high-quality, since the number of pages may be fairly small.

FCD 415 of app previewer 1530 may provide actual values to input fields from data stored in ODB 125, by analyzing the BI information stored in UDB 120 or by selecting input examples from a similar vertical website or app. Providing values to fields may be useful in previewing the app screens without actually running the app. For example, for an e-commerce website, app previewer 1530 may extract product information of ten random products, including product name, picture, price description and the like, random ten product categories etc. App previewer 1530 may then use the data in the relevant places when rendering the relevant screens, providing the designer with more realistic simulation of actual app execution.

It may be appreciated that the preview solution with actual values in some of the fields may be non-interactive. App previewer 1530 may provide a user interface for the designer to update field content and re-render the screen with new values (so to simulate specific app pathways which depend on specific input values), instead of using real data extracted from ODB 125 however this may affect the performance when using the cloud based simulation as a it may require round-trip traffic to the simulation servers.

Another solution may involve a use of specific simulation cloud servers adapted to the system's requirements, possibly combined with versions of the base application adapted to run optimally on the simulation cloud servers. An advantage of this solution is that the system may multiplex simulator instances, using a single simulator instance for multiple users. Such multiplexing requires the WBS vendor to manage the simulation servers, including functions such as, tracking which servers are alive, tracking message passing and connectivity with the servers, provisioning the servers, checking server performance which may require specific cooperation or special provisioning by the $3^{rd}$ party simulator service vendors.

Prior art emulation systems typically execute apps using software emulation of the popular mobile device environments, such as Google's Android and Apple's iOS. Such software emulation may be as much as 1:50 slower than direct hardware execution. This may be improved in a number of ways such as using servers having the same underlying hardware and software architecture as the emulated mobile device. For example, for Android systems, using ARM-based servers which run the Android system directly, or using regular servers which run a version of the mobile OS compiled for the regular server architecture. This may be done for some system, e.g. Android, but not for others, e.g. iOS. Such a server configuration may be created, but would require cooperation with the server cloud provider, and possibly require the creation of specific management software and specialized provisioning. Alternatively, such a server configuration can be provided as part of the AGWBS 100 itself. Alternatively, AGWBS 100 may provide a version of the base apps ported to common server architecture (such as x86/Linux). Such a version could run efficiently on regular server farms, but would require AGWBS 100 to maintain an additional version of the CAE (or x86/Linux) in parallel to the regular (e.g. Android/iOS) CAE version. This server-adapted CAE version would allow high-performance native hardware based execution of the converted apps.

Figure 17D:
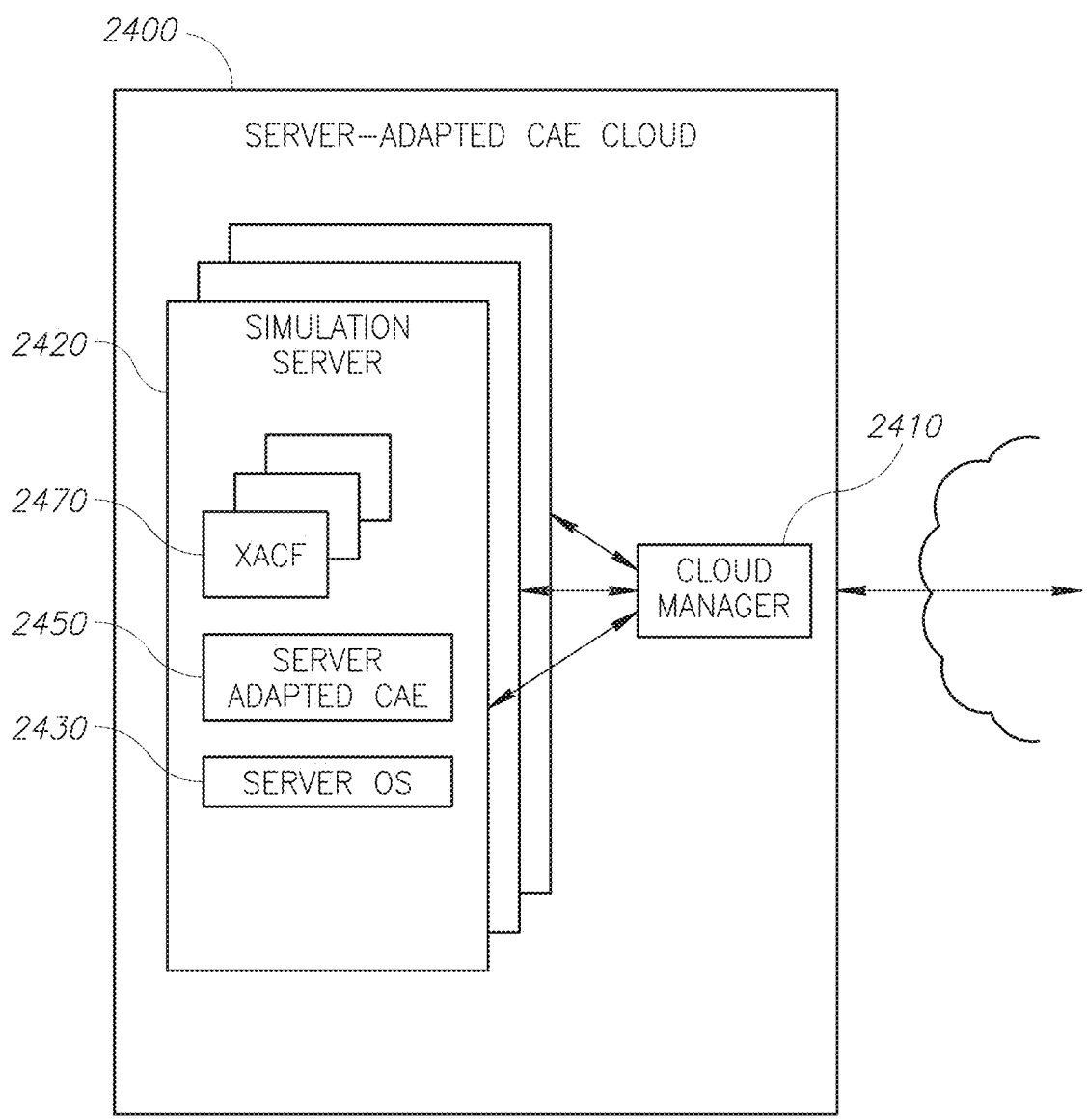

Reference is now made to FIG. 17D which illustrates a sample implementation of the novel server-adapted CAE cloud described above. Server-adapted CAE cloud 2400 is shown, comprising of multiple simulation servers 2420 and cloud manager 2410 which may coordinate the multiple simulation servers 2420 and provide services such as session management, load balancing and failure recovery. Each simulation server 2420 may comprise of server OS 2430, server-adapted CAE 2450 and multiple XACFs 2470. The I/O redirection function (similar to I/O redirector 2040 in FIG. 17B) may be performed by server-adapted CAE 2450 (although the system may implement a separate I/O redirector similar to I/O redirector 2040). Multiple XACFs 2470 may be local copies of XACFs 140 sent by AGWBS 100. In one embodiment of the system, the server-adapted CAE 2450 may be is capable of executing multiple XACFs 2470 simultaneously.

As noted above, simulation servers 2420 may be pre-adapted to the execution of server-adapted CAE 2450 (possibly even using a specific underlying processor and architecture). Furthermore, cloud manager 2410 may be designed so to cooperate with AGWBS in managing simulation sessions and multiplexing simulation servers 2420 so to best support multiple app simulation on each simulation server 2420.

App previewer 1530 may alternatively create an additional preview version of the app, executable within a browser, or the browser's plug-ins or extensions. This preview version may be built using a client-side rendering language which may provide substantial graphics and animation capabilities. The preview version may be executed on the designer development desktop environment, though the browser running on the designer computer 150 or through a standalone client-side renderer such as standalone Adobe Flash environment.

In another embodiment app previewer 1530 may use the SVG W3C open standard to render the app screens. It may be appreciated that other client-side rendering languages and platforms may be used, such as the WebGL standard, HTML5's Canvas option, Adobe Flash and the like, or any combination of such and similar technologies. App previewer 1530 may provide preview of the main screens only or of the full app. The preview may provide a similar look and feel to that of the converted app and may provide a user interface to enable manual data entry into input fields, but may not provide the full functionality of the app.

App previewer 1530 may provide an emulation of every version of each user interface widget for any mobile operating system. App previewer 1530 may create a data file similar to XACF 140 (FIGS. 1 and 2) describing the various widgets and other user interface elements used in the app, and may provide indication which element is an input field. This data file may be interpreted using, for example, a JavaScript preview run-time engine, embedded in app previewer 1530, which may read these files and may perform the required SVG generation and execution. App previewer 1530 may typically use pre-generated SVG-based application element and widget templates which may be used and adapted according to the data file definitions.

In an alternative embodiment, app previewer 1530 may download a JavaScript/SVG file which may be directly executed in the browser.

It may be appreciated that any update the designer may do, that may have an impact on the generated app user interface, may be updated in the SVG code by app previewer 1530. This code update may be executed entirely by WBS client 1500 in the browser, so the simulation may appear highly responsive as the turnaround time may be extremely low. The values that may be inserted into the SVG application elements and widgets may include, for example, products, product fields, themes and text captions.

The SVG screens may be based on SVG templates created manually, or automatically for specific widgets through analysis of the displayed widgets. Such analysis may include the execution of the app on a simulator, capture of the generated display screens including their content, identification of the user interface elements including text and images with all their relevant attributes such as size, position and orientation (using in particular the known information about the defined widgets and their parameters for each specific screen). The outcome may be used to automatically generate an SVG template of each screen, including field placeholder definitions for input. The automatically created SVG templates may be edited to add the required logic and component relationships as needed.

App previewer 1530 may render complex graphic effects as part of static displayed screens. Complex graphic effects may include blurring an image, combining multiple images and the like. App previewer 1530 may simulate such effects in run-time, as the graphics effects may be applied to dynamic user-specific data (and thus can't be pre-applied). For example, if the app being previewed applies a blur effect to the images included in a product selection user interface, some of these images may be products that the user may have dynamically fetched. It may be appreciated that such effects may not be available in regular browsers (through the use of HTML) during runtime. Instead, App previewer 1530 may use a combination of SVG graphics effects filters, as described in <http://www.w3.org/TR/SVG/filters.html> to mimic the required effects.

Once the application is mature the designer may want to submit it to ADPs 170. App submission support module (ASSM) 1540 may provide automation services to the app submission process. ASSM 1540 may be installed on computer device 150 as a native component or as a plug-in or extension of browser 155. In one version, ASSM 1540 may provide a one button publishing widget. Most or all of the information needed to publish the app is known to AGWBS 100 and the designer may not be required to determine any publishing parameters, or edit the app in any way. The process may be completely automated and may suit for untrained or beginner level designers. The submission process via ADP 170 is further described hereinbelow.

ASSM 1540 may provide submission process automation though a locally-installed software module. ASSM 1540 may be pre-installed on computer 150 as a native component or alternatively as some type of browser plug-in or extension. ASSM 1540 may communicate with the AGWBS 100, and may receive the full app submission information entered by the user or created through website/user/app analysis as described above. ASSM 1540 may execute on computer 150 guiding the designer through the submission process and automatically operating the various software elements needed to complete the submission process.

ASSM 1540 may achieve such automation, for example, though any of the known UI automation methods such as UI display tracking, mouse/keystroke simulation or OS automation interfaces or operating software interfaces on computer 150 which may communicate and cooperate with the user side app submission software modules. For app submission process running in a browser, ASSM 1540 may provide an internal browser window (e.g. an HTML control) which may be controlled by the ASSM or operate an intermediate layer which may inject the appropriate code into the app submission website operated by the user so to support the user.

ASSM 1540 may have deep understanding of the submission process software elements, and may be able to interact (programmatically) with the UI so to walk the user through the process. This may include handling of various exception cases, missing information requests, human examiner interactions etc. It should be noted that the submission process may be operated in a series of sessions, since (for example) human app examiner responses may require some time to arrive.

The website and the corresponding app may be created by AGWBS 100, and edited and previewed by WBS client 1500. The created app may execute eventually on mobile device 160.

Figure 18:
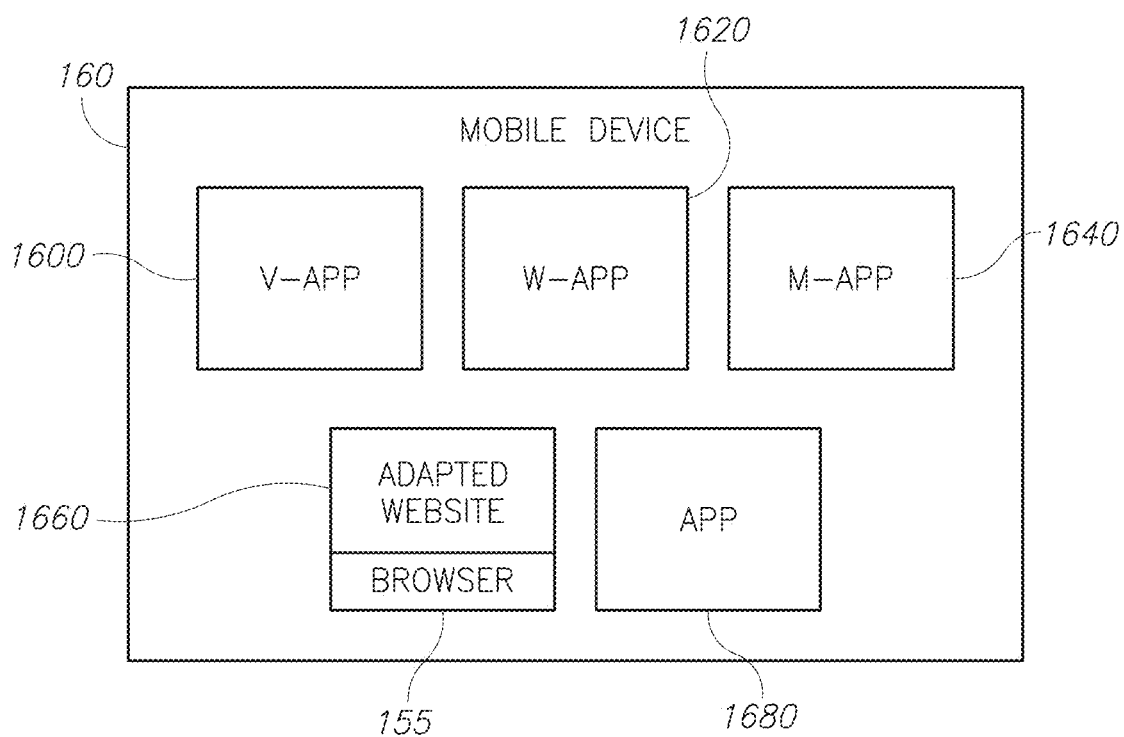
FIG. 18 is a schematic illustration of the possible ways to run or simulate the applications on a mobile device.
Figure 19:
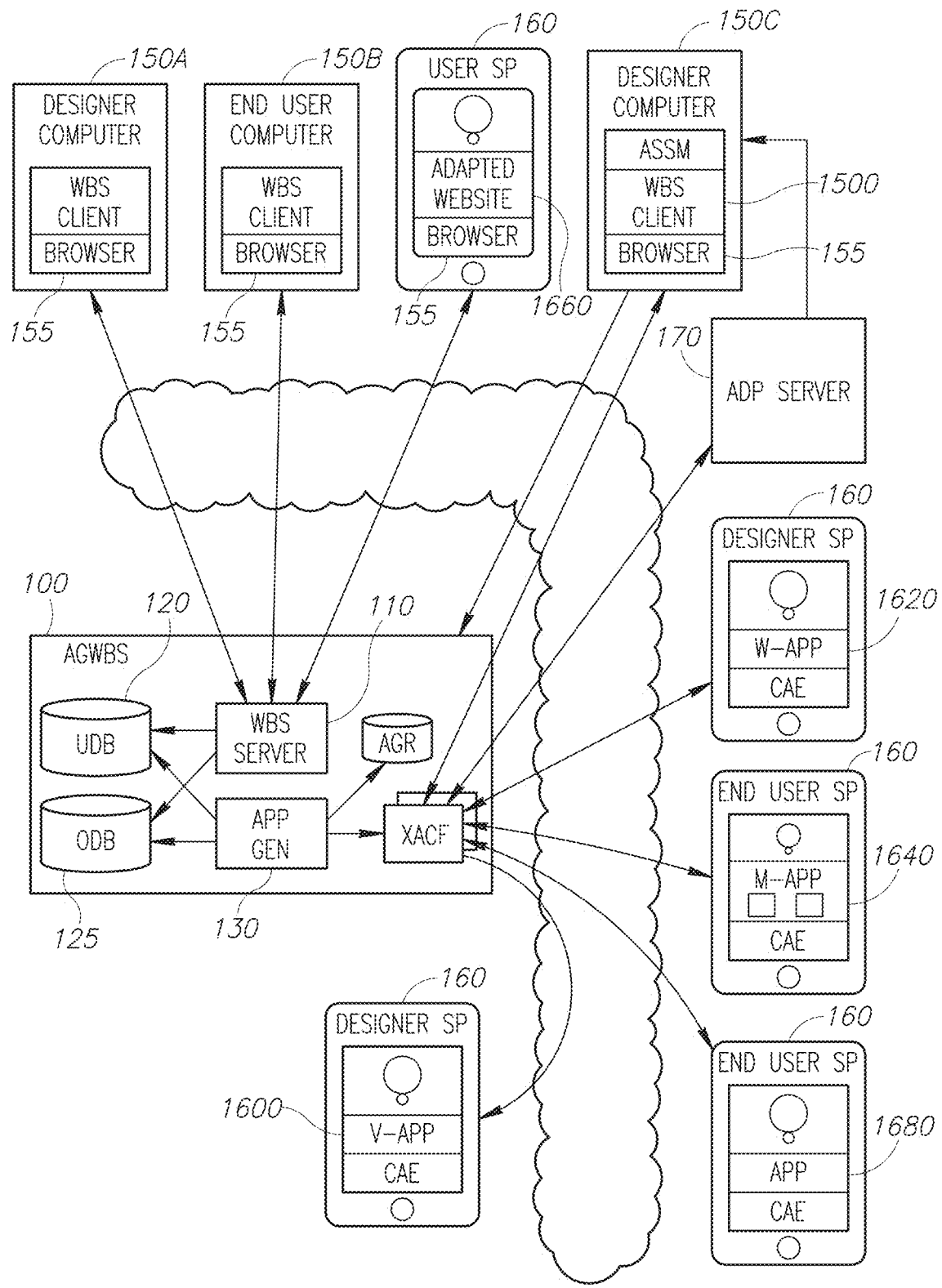
FIG. 19 is a schematic illustration of all clients capable of connecting to AGWBS.

FIG. 18, to which reference is now made, illustrates a mobile device 160 that may run any app created by AGWBS 100, including a visualizer app (V-app) 1600, a WBS gateway app (W-app) 1620 and a multi-app (M-app) 1640) as well as the adapted website 1660 (adapted to display on a mobile device) or the mobile app 1680. FIG. 19 illustrates the full set of clients capable of connecting to AGWBS 100. Visualizer app (V-app) 1600 may provide a quick preview of the converted app on a mobile device without requiring the user to go through the standard app distribution procedure, involving ADP 170, as will be detailed hereinbelow. During the different app development stages the designer may wish to avoid lengthy submission procedures, substantial and often unpredictable delays and substantial fees. These obstacles may be particularly problematic near the application finalizing deadline when the designer may want to quickly test a series of versions of the app and update them multiple times, e.g. when fixing the last detected issues with the developed app.

V-app 1600 may comprise a generic version of the CAE (Common App Engine) used by any application created by AGWBS 100, extended to support the V-app functionality as described hereinbelow. It may be distributed by the standard ADP and may be available on all relevant app stores. Unlike other apps created by AGWBS 100, V-app 1600 may not include XACF 140. It may be installed on mobile device 160 owner by the designer and provide a preview for apps during their development. V-app 1600 may preview an app being developed by receiving the app relevant XACF 140 and activating it as part of V-app 1600.

V-app 1600 may be activated on the designer mobile device 160 and may contact AGWBS 100, providing AGWBS 100 with its necessary credentials such as username and password, to fetch the relevant XACF 140 of the app to be previewed. V-app 1600 may provide a user interface to select a specific XACF in the case where the same designer may own several applications. V-app 1600 may execute the retrieved XACF 140 while displaying the app screens on mobile device 160.

It may be appreciated that V-app 1600 may only download data, configuration and/or associated media files, which may not contain executable code as this may be the type of download allowed under the typical rules and limitations enforced by ADPs, responsible to the distribution of V-app 1600.

V-app 1600 may be part of AGWBS 100 and not to any designer that may use AGWBS 100. It may be distributed by ADP like any other standard mobile app and may have its own icon. It cannot fully function unless XACF 140 of an application is downloaded from AGWBS 100 to mobile device 160 on which V-app 1600 may be installed. Without XACF 140 V-app 1600 can only execute the basic administrative functions, such as entry of the AGWBS 100 credentials or selection of a specific XACF 140 to download. V-app 1600 can only execute on mobile device 160 of a designer registered in AGWBS 100 as user credentials must be provided in order to fetch XACF 140 of the relevant app. V-app 1600 may allow a user to discard an existing (downloaded) XACF 140 and download a new XACF 140—in particular when updating to a newer version of the same XACFF 140.

V-app 1600 may be limited in a number of ways, such as by the number of concurrent designers eligible to use the same XACF, by limited duration in which a designer may be eligible to use a specific XACF and by a specific watermark that may be displayed on the screens of the running app to mark it as a temporary, non-final app. All these limitation may prevent the use of V-app 1600 with XACF 140 as a final app. The final app version may only be distributed to end users via the regular ADP process. Once the designer has finished previewing and testing the developed app though V-app 1600, he may submit it to the ADP in the regular way as described hereinbelow.

It should be noted that the V-app 140 is generic to all designers using AGWBS 100, and may be submitted to the ADP under the ownership of AGWBS 100 vendor, and with associated marketing and Search Engine Optimization (SEO) information belonging to the vendor of AGWBS 100. Thus, a designer building an app using AGWBS 100 (and previewing/testing it using V-app 140) may need to switch to regular ADP distribution to have the distributed app marketed under his own brand, use his own marketing materials and his own SEO information, require the ADP to charge a fee for the app installation on the designer's behalf etc.

AGWBS 100 may provide a generic WBS gateway (W-app) app 1620 to enable the designer to access all his owned apps. W-app 1620 may be installed on mobile device 160. Once installed on mobile device 160 of an eligible designer, who may be identified by providing the needed credentials, W-app 1620 may provide a user interface to browse through the designer owned websites, created and hosted by AGWBS 100. The designer may use W-app 1620 to activate mobile application generator 130 to convert any of his owned websites to an app. W-app 1620 may also function as V-app 1600, providing an immediate preview of the generated app before starting the formal submission process.

In may be appreciated that the activating method of mobile application generator 130, using adapted website 1660 or W-app 1620, may be stored in UDB 120 as part of the collected BI information and may be analyzed for future facilitation of the conversion process. The information may include additional websites or converted apps owned by the same designer, specific adaptation made to other mobile websites or apps such as color changes, mobile device parameters and the like.

Figure 20:
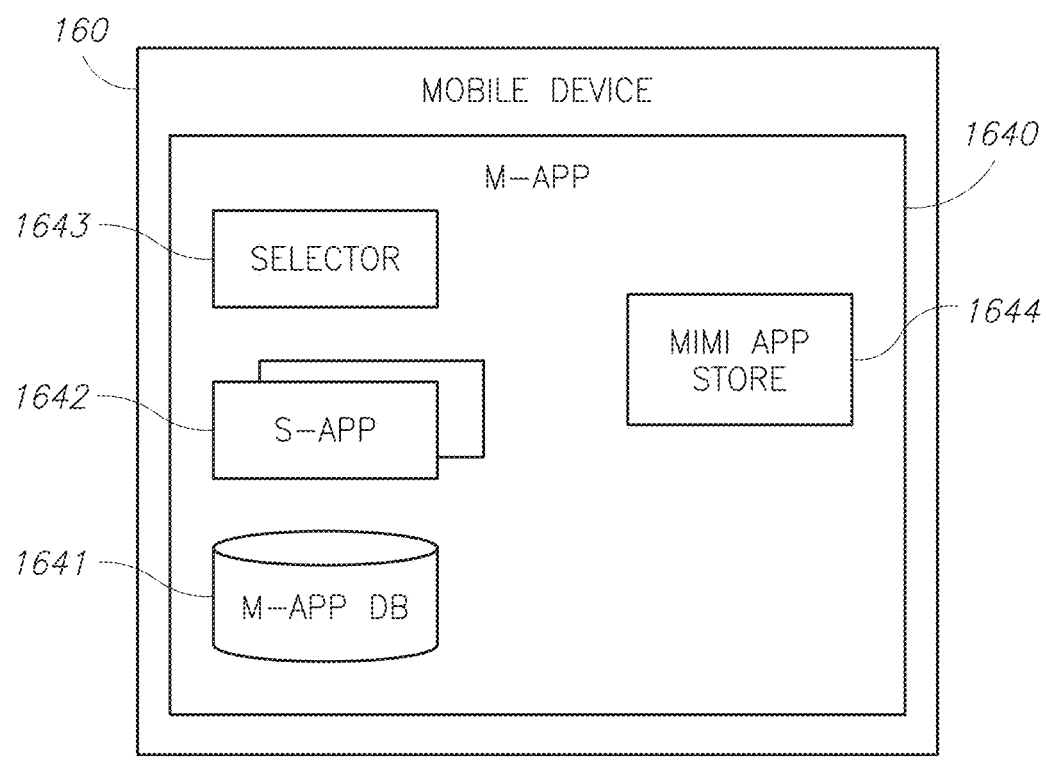
FIG. 20 is a schematic illustration of M-app.

FIG. 20, to which reference is now made, illustrates M-app 1640, constructed and operative in accordance with a preferred embodiment of the present invention, and comprises a plurality of s-apps 1642, an m-app database (m-app DB) 1641, a selector 1643, and a mini app store 1644 installed on the mobile device 160. It may be appreciated that AGWBS 100 may provide server-side support for some of the M-app 1640's elements functionality as further discussed below. For example, the system may provide a server-side recommender engine which supports mini app store 1644 (providing recommendation on which s-apps may be of interest to the user). Such recommender engine may execute on the AGWBS 100 server so to integrate s-app usage data from multiple sources and multiple users and end-users (subject to relevant privacy limitations). The recommender engine may be a server cohosted with all AGWBS 100 servers or can be a remote server accessed by AGWBS 100 over a communication medium, such as the Internet 199.

Multi-app (m-app) 1640 may provide a container that may execute multiple sub apps (s-app) 1642 inside it. The concept of m-app is somewhat similar to e-book reading apps, such as Apple's iBooks, which may have one app enable reading multiple books, with the difference that an s-app 1642 is an actual app and not only the content of an app. Furthermore, each s-app 1642 may have some associated information included with it (such as logo, title, description, marketing details, meta-data and descriptive tags). Such information may be stored in m-app DB 1641 and may be viewed through selector 1643 described hereinbelow.

M-app 1640 may load and manage multiple s-apps 1642, providing a quick method to install s-apps 1642 and run them. M-app 1640 may provide the designer an easy and immediate publication and market-testing venue, before publishing any app as a stand-alone app through the standard ADP 170 publishing method. AGWBS 100 may publish and promote a single m-app 1640, while branding it and creating traffic to m-app 1640 in ADP 170, or multiple branded m-apps 1640, each oriented to a different specific market (e.g. a book oriented m-app, a gadget oriented m-app etc.)

M-app 1640 may provide selector 1643 that may provide browsing and selection methods for s-app 1642 and may enable the user to select which s-app 1642 to run. An end-user may install a single m-app 1640 in his mobile device 160 with all its content without having to install the multiple s-apps separately, i.e. AGWBS 100 may provide specific "filled" m-app 1640 which may include a set of pre-defined (bundled) s-apps 1642. Such "filled" m-app 1640 may be closed (i.e. only support the specific s-app 1642 included with the installed kit) or open (i.e. allow use of a mini-apps store 1644 to download and install additional s-app 1642).

M-app 1640 may manage a local database m-app DB 1641, on mobile device 160. M-app DB 1641 may store all installed s-apps, with their XACF 140's, s-app 1642 associated information (such as logo and description) as described above, and all s-app 1642 related versioning information. M-app 1640 may create notifications regarding available s-app 1642 updates, updates to specific s-app 1642 associated information and version information such as "the XXX sub-app was just released in version Y, offering features A, B and C" etc. M-app 1640 may receive such information from AGWBS 100 through the use (for example) of push notification or polling mechanism.

M-app 1640 may also manage a local user profile in m-app DB 1641, including s-app 1642 usage information, and may display, for example, a "least recently used s-apps" display.

AGWBS 100 may provide services to m-app 1640 such as promoting a specific s-app 1642, send notification when a user enters m-app 1640 end the like. AGWBS 100 may also include communication and information sharing between multiple s-apps 1642, by the same or different m-app users (through communication services provided by the AGWBS 100 server or by the m-app 1640 itself).

M-app 1640 may use an API, provided by AGWBS 100, and use the services it may provide. When a specific s-app 1642 may be selected by selector 1643, m-app 1640 may parse s-app related XACF 140 and generate the user interface of selected s-app 1642 in run-time. It may be appreciated that m-app 1640 may run any s-app 1642 so that the user interface and the functionality of s-app 1642 may be similar to that of a regular app running directly on top of the mobile device operating system.

M-app 1640 may further provide the ability to open and run multiple s-apps 1642 simultaneously. Several s-apps 1642 may share the same running m-app 1640, which may support different context to each running s-app 1642 since all s-apps 1642 may be based on the same CAE. When multiple s-apps 1642 run simultaneously, m-app 1640 may switch between s-apps using a UI similar to that provided by the underlying operation system for the same purpose. Note that this version of CAE may be a specialized version capable of handling multiple application contexts which may be different from the regular (single app) CAE.

It may be appreciated that ADP rules may often limit an app from changing its basic "nature", though other modifications such as changing the app content or its design may be permitted. Thus, m-app 1640 may be specialized to specific vertical or sub-vertical. For example, a specific m-app 1640 may support only clothing e-stores, thus may be able to contain only specific clothing e-stores s-apps 1642. Such m-app 1640 may be considered as a virtual "clothing e-mall".

As s-apps 1642 are not standard applications they may not be distributed by ADP and standard app installation methods may not be suitable to install s-apps 1642 instead an s-app installer, located on AGWBS 100 may be used.

When m-app 1640 is installed on mobile device 160, installation may be done using an installation URL or QR code, where the user may scan a QR code which may invoke an app installation URL, which may invoke the m-app directly (as the m-app may be registered on the mobile device 160 to "listen" to the specific URL), and may provide the details of a s-app 1642 to be installed (from the AGWBS 100) as a parameter. M-app 1640 may recognize s-app 1642 and may download the relevant XACF 140 AGWBS 100. The new installed s-app 1642 may be registered in m-app DB 1641 and the relevant user profile entries may also be updated in m-app DB 1641.

If m-app 1640 is not installed on mobile device 160, when a request to install s-app 1642 is activated, the user may be first redirected to download and install m-app 1640 from ADP 170 and only then, after m-app 1640 is installed on mobile device 160, the installation of the selected s-app 1642 (inside the M-app 1640) may continue as described hereinabove.

It may be appreciated that m-app 1640 just installed may not be aware of the selected s-app 1642 details that may have triggered the installation of m-app 1640. In particular, ADP 170 from which m-app 1640 was installed may not further redirect the calling application to another URL. Existing ADP's 170 may not include a mechanism to transfer data from the installation URL to the installed app when it is activated for the first time, though some ADP's 170 may provide a suitable formal mechanism, such as saving a cookie with the pertinent information (which can be retrieved after M-app 1640 installation is complete), or providing an event from the mobile operating system to the installed M-app 1640 which includes the full referrer URL information used to install M-app 1640 (including the selected s-app 1642 details).

Alternatively, M-app 1640 may automatically install s-app 1642 that triggered m-app 1640 installation, using a mechanism capable of storing s-app 1642 installation details to be used by m-app 1640 after its installation may be completed. This functionality may be provided by a fingerprinting server (FPS) accessible through the Internet capable of providing a store and retrieve service for the required s-app 1642 details. The FPS may receive and store s-app 1642 details on the first invocation of the installation URL, and may hand these details over to m-app 1640 after it was installed.

Figure 21:
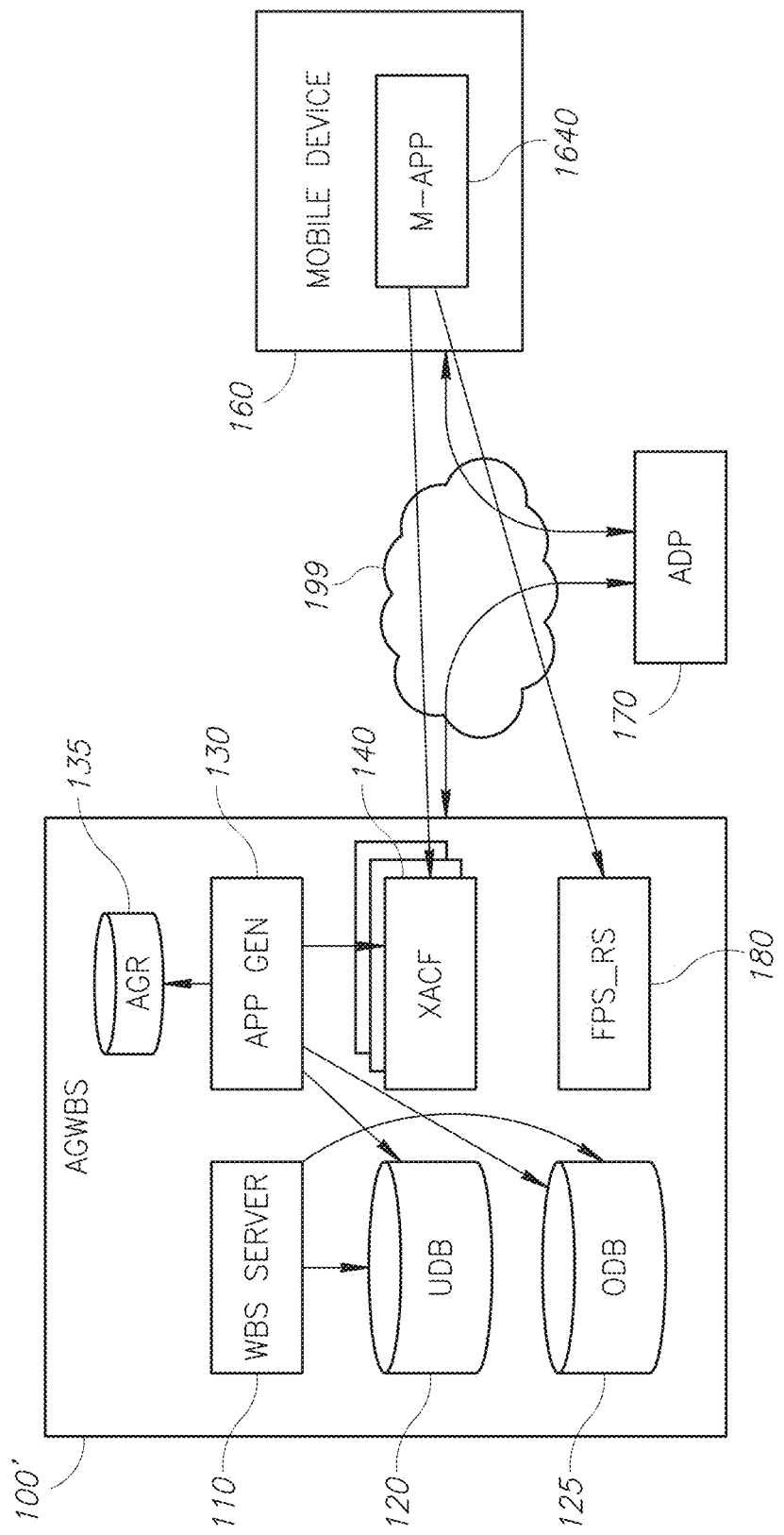
FIG. 21 is a schematic illustration of an alternative embodiment of AGWBS operating with a finger printing and redirect server.

Reference is now made to FIG. 21, that schematically illustrates AGWBS 100, constructed and operative in accordance to a preferred embodiment of the present invention, comprises a finger printing server and redirect server (FPS_RS) 180 in addition to other servers illustrated in FIG. 1 namely WBS server 110, UDB 120 and ODB 125, app gen server 130 and XACF 140.

FPS_RS 180 may be used to keep track of the original s-app 1642 installation request that originally triggered the installation of m-app 1640 from ADP 170, as s-app 1642 may only run in the context of m-app 1640 and may redirect clients to other locations. It may be appreciated that FPS_RS 180 may be a combination of two separate servers, a fingerprint server and a redirect server or may be collocated on a single server.

FPS_RS 180 may generate a fingerprint to identify a specific mobile device connecting to it. The fingerprint may use any unique mobile device identification which it may access such as its user agent details, location, IP number, screen height and width etc.

FPS_RS 180 may send, after first accessed, an HTML/Javascript web page section to run on the mobile device. This code may collect accessible device details and send it back to FPS_RS 180, which may create a record containing the received information. The information may include details about s-app 1642 that user 161 asked to install. The created record may be assigned a unique identifier, called fingerprint, and stored in FPS_RS 180. FPS_RS 180 may later access and delete the created record according to its fingerprint.

User 161 may try to install s-app 1642 by accessing a specific URL from which s-app 1642 may be installed. The URL may be provided to mobile device 160 by any suitable mean such as a banner, a website, a QR code or the like. User 161 may follow the URL which may direct to FPS_RS 180. FPS_RS 180 may generate a fingerprint to mobile device 160 and redirect it to m-app 1640 installation in ADP 170. After m-app 1640 is successfully installed on mobile device 160 m-app 1640 may be activated and may access FPS_RS 180 on which a fingerprint has been previously created with details regarding the desired s-app 1642. FPS_RS 180 may access previously created fingerprint containing any requested s-app 1642 details. M-app 1640 may install s-app 1642 as described hereinabove. FPS_RS 180 may update the fingerprint information to indicate s-app 1642 was successfully installed on mobile device 160.

Another embodiment may use any local storage mechanism such as browser cookies and the like to pass s-app 1642 details between the web page directing the s-app 1642 installation and the post-installation first run of the M-app 1640. In this case, any s-app 1642 information may be saved when s-app 1642 URL is invoked, e.g. stored in a cookie which may be later read by m-app 1640 and used to install the appropriate s-app 1642. Such a mechanism may be "formal" (i.e. explicitly provided by the mobile device 160 OS for this purpose) as described earlier, or an existing system mechanism used for this purpose.

It may be appreciated that s-app 1642 installation may be triggered, in addition to a manual user request, based on mobile device 160 physical location or as a result of installation request received by mobile device 160. M-app 1640 may use the GPS or the Wifi or any other means to determine the mobile device location and it may receive an installation request message via the built in push notification function or any other supported messaging mechanisms such as email SMS or the like.

M-app 1640 may pop up a menu, allowing the user to select which s-app 1642 version to install, when there are multiple options such as in a mall, where each store may have a different s-app 1642 app. The installation procedure may also activate an alert to notify user 161 of the newly installed s-app 1642.

M-app 1640 of a specific vertical may include a mini app store 1644 distributing s-apps 1642 covering the same vertical. Mini app store 1644 may enable user 161 to review s-apps 1642 offered by AGWBS 100 in the same vertical and install them. M-app 1640 may offer regular tools available in existing ADP 170 such as app meta-data, search, division into sections, last accessed, featured, promotion, user ratings and reviews, and the like. M-app 1640 may also offer tools specific to the specific vertical such as industry specific references and reviews. S-apps 1642 may be offered for free, and user 161 may access any available s-app 1642 applicable to operate with specific m-app 1640. However, in an alternative embodiment, m-app 1640 may offer premium s-apps 1642 for which user 161 should pay. This may be implemented using an "in-app payment" feature available on many mobile device platforms.

The app designer may convert s-app 1642 to a standalone app. It may be appreciated that standalone apps may get a full entry in the ADP with the associated private branding, promotion possibilities, specific SEO information and other benefits. AGWBS 100 may also provide standalone app publishing capabilities. Existing installations of s-app 1642 on mobile devices 160 may not be affected by the creation of a full standalone app and the end-user may continue using s-app 1642 in the context of m-app 1640. Once a full standalone app version is created it is the version that may be published and downloaded and s-app 1642 may not be published and downloaded anymore. FPS_RS 180 may redirect all download requests to the ADP where the full standalone app may be installed.

End-users who are using m-app 1640 may be offered the standalone app URL. If the standalone version is not installed on mobile device 160, the URL may be ignored and the s-app 1642 may be activated by m-app 1640. If the standalone app is installed, the URL scheme would cause the URL to open inside the standalone app, so effectively the end-user would be switched to the standalone version.

M-app 1640 may also promote upgrading s-apps 1642 to the standalone version. This may be done, for example, using advertisements or notification promoting such upgrades, or special marking such as a special ribbon for s-apps 1642 which may be upgraded.

As noted above, app submission and distribution may be performed through ADP 170 (FIG. 1) which may be typically operated by (and is closely integrated with) the mobile device operating system vendor. In particular some ADP 170 vendors, such as Amazon, are content providers only, without being operating system providers. Some mobile device hardware vendors license their operating system from a central source (such as Google's Android) but operate their own private app stores. Some vendors may offer competitive $3^{rd}$ party app stores which may compete with the primary app stores operated by the mobile device operating system vendors based on various capabilities or niche market orientation, such as alternative Android app stores.

AGWBS 100 may submit generated application to one or more ADPs 170. The publishing may be triggered by ASSM 1540, directly by user 151 accessing the WBS client 1500 from his computer 150, or by the designer through W-app 1620 installed on his mobile device 160. When publishing is requested, WBS client 1500 (for example) may ask to enter some details regarding the submitted app. Such information may include the name to be associated with the app, which may also be generated automatically by some sort of semantic analysis done on the corresponding website such as finding the website title. The information may also include an icon representing the app, which may also be generated automatically from the logo of the corresponding website, or by using the first letter of the app name and the base app color used for background or any other semantic website analysis. The information may also include promotional keywords, which may be extracted from the website SEO information. Other app details such as app description, contact e-mail and icon label may also be extracted from the web site using semantic analysis.

ADP 170 may require additional app related information such as app users expected age range, indication of references to violence or tobacco or gambling etc., indication of the use of encryption, any required associated information such as refund policy, terms of use documents, privacy policy etc., app screen shots or other promotional pictures for use in ADP 170 and the like.

Sample screen shots may be generated automatically by AGWBS 100 using the main-screen determination algorithm described hereinabove. AGWBS 100 may allow the designer to select specific screen shots and to specify field values to use in the selected screen shots used by ADP 170.

The app submission process may differ between different ADP's 170 and may be impossible to completely automate by some app submission software interface between AGWBS 100 and ADP 170. ADP 170 may fail to provide a submission API, or may provide a partial API which may not cover all submission stages. ADP 170 may require that the submission process is made through a specific web site, to be accessed from WBS client 1500 or through some specific software application that should be installed on computer 150. User 151 may be required to electronically sign some forms, and it may be legally impossible in some jurisdictions for the system to perform this "signing" on behalf of user 151. The submission process may also require some personal human communication with an ADP 170 representative (for example) who may examine the submitted app. Such communication may be textual, audio or video-conference based.

The support team of AGWBS 100 may include a submission team that may be responsible to support the submission process. The team may fully or partially submit the app on behalf of the designer.

It may be appreciated that the created website and/or the created corresponding app may change over time. The website may change in content and/or in design as well as the corresponding app. In addition, the CAE may also change.

App content changes (i.e. changes related to the content managed by the app and typically stored in the ODB 125) may be automatically applied to mobile device 160 when the app connects to AGWBS 100. However, such changes do not change the app design and require no change to the XACF 140. If, for example, in e-commerce context, some app content such as categories, products and product details, is added, remove or modified, the app may automatically use the updated content once the app connect to AGWBS 100. Furthermore, some apps may provide a specific user interface to support content change. For example, a mobile device inventory tracking app may provide a simplified user interface for use by warehouse employees, allowing them to update the inventory DB of a large e-commerce system without having to access the full-fledge e-shop app. With such a content update app, content changes may be originated in the app, may be applied to ODB 125 when communication between the content update app and AGWBS 100 is established.

App design changes may result from changes made to the corresponding website, as reflected in UDB 120, or from changes made by app editor 350 to the app. These typically minor changes do not change the nature of the app, and may be reflected only in XACF 140 data. These changes may not require any code change.

The app may start running on mobile device 160, having communication with AGWBS 100 and may check whether XACF 140 on AGWBS 100 is more recent than the one that may be stored on mobile device 160. If the XACF 140 on AGWBS 100 is newer, it may be downloaded to mobile device 160 and stored as the latest XACF 140 version to be used with the app. One advantage of this method is that the XACF update is execute "in place", modifying the existing installed app, and does not require the user to go through a new (and lengthy) ADP submission process.

Alternatively, AGWBS 100 may provide a push based updating mechanism to partially or fully update XACF 140. This alternative may be more suitable for apps running continuously, or running a long time such as long term data collection apps, which may not be updated often enough. The push notification solution may be based on period polling of AGWBS 100 during the app running time, or on a push notification mechanism provided by the mobile device operating system which may trigger the push update. It may be appreciated that some app content change may be reflected only on ODB 125 and not on XACF 140 thus may not require a new version of XACF 140 to be downloaded to mobile device 160.

AGWBS may also support CAE changes which may result from AGWBS 100 improvements, modifications, or bug corrections resulting in a new CAE binary. All apps using the CAE which was modified may need to be resubmitted to ADP 170 and reinstalled on all mobile devices 160. AGWBS 100 vendor may also resubmit an updated version of the relevant WBS vendor supplied apps (i.e. V-app 1600, W-app 1620 and M-app 1640). Users may still use the old version of the website and the app. Furthermore, when generating an updated XACF 140 for app design changes, AGWBS 100 may generate multiple versions of XACF 140 to support older versions of the CAE, and the CAE may retrieve the version of XACF 140 adapted to the CAE version. This way, even if the CAE was updated in ADP 170, existing users with installed, older, CAE (inside a specific mobile app 160 or any of the WBS vendor supplied apps) may still receive app updates without requiring any reinstallation.

A new CAE may only be required if the underlying website, as defined in UDB 120, or the generated app were modified to use specific features, such as new widgets, supported only by the new CAE. In this case, the app may need to be reinstalled on mobile device 160 to include the new CAE. It may be appreciated that a CAE may use data-driven features such as having widget definitions as data rather than code. In such a case, updates to these CAE data files (defining the widgets), which do not require binary code updates, may be made without requiring a full-scale app resubmission and reinstallations.

As described hereinabove, the original website, from which the app was converted, may be modified by the designer using WBS server 110 at any point in the lifetime of the converted app. AGWBS 100 may ignore the changes, so they won't affect the generated app in anyway. AGWBS 100 may incorporate the changes automatically to the app, such that all app users are also affected by these changes immediately, e.g. when the changes are limited to the underlying app content stored in the ODB 125 (such as product tag changes). AGWBS 100 may incorporate the changes automatically the next time an XACF is generated by the user. Thus, such changes would only affect app users who access the new XACF. AGWBS 100 may alert the user regarding the change, and may let him decide whether to get the new changes. It may be appreciated that the website designer and the app designer may be different persons so a notification or an alert may be required.

Generally, AGWBS 100 may ask for the user approval before incorporating website functional and interface changes into the app installed on mobile device 160 and incorporate automatically only changes in back-office ODB 125. For example, in an e-commerce website such changes may include entering new products, new categories, renaming products and categories, choosing product images, setting pricing and sales, checkout-related settings such as available payment methods etc. All of these changes to back-office ODB 125 may be automatically reflected in the app since the app and the website may use the same backend ODB 125.

AGWBS 100 may not automatically apply changes made to the website to the corresponding app and XACF 140 may only be changed explicitly by a designer manual editing through app editor 1510. AGWBS 100 may alert the app designer that a change was made to the web site and it may be required to incorporate a similar change to the app. Alerts may be raised for example when an analysis that was re-executed on a current version of a website may provide different results from the results of the same analysis made on the original website. Such analysis may include analysis of the website structure, MVF identification, brand color determination, color scheme selection, layout recommendation etc.

For example, an e-store website did not have any category when built. The corresponding app may not have a categories screen. If categories were added to the website after the initial conversion, when XACF 140 was already created, AGWBS 100 may alert the app designer with a recommendation to add a category screen to the app. If the website designer added a major component to the website, like a blog, AGWBS 100 may send an alert, if a corresponding widget may be used in the generated app, recommending adding a blog feature screen to the app. If the app designer imported some static pages from the original website into the app, and these pages were deleted from the website, AGWBS 100 may recommend the app designer to delete the matching screens from the app as well. The app designer may use any of the preview capabilities to evaluate the possible effects of the recommended changes on the app.

Adapted website 1660 may allow the designer to initiate the app creation process directly from a mobile device. The system may identify eligible designers by requesting designer identification information, such as his login credentials. Registering eligible mobile devices as "designer owned mobile devices" or using the mobile-device built in identification means, such as biometric identification devices.

A typical workflow using website conversion system 10 may include some or all of the procedures summarized hereinbelow. Site structure analyzer 380 may analyze the website presentation layer as stored in UDB 120, and any additional website related information stored in UDB such as VSE, hints etc. Backend elements handler 400 may analyze the operational data stored in ODB 125. Color and Themes Setter 390 may analyze the website colors, themes, styles and visual design and may determine which colors and themes to use. Site usage analyzer 370 may analyze the collected web site BI information stored in UDB 120. Complex component convertor 360 may analyze the web site component semantic functionality and may convert underlying component parameters and setting to these applicable to the app widgets. In addition it may convert additional pages which are not a part of the main vertical functionality and add screens to the app which are related to the main vertical functionality but not necessarily a direct transformation of any page from the website such as instant messaging functionality. MVF identifier 310 may determine which vertical base app (or combination thereof) to use. Base app builder 320 and vertical base app mixer 340 may determine specific widgets and flow to use including selecting the appropriate widgets according to data stored in ODB 125. App editor UI 1510 may be used by the designer and communicate with app editor 350 to customize the app. Screen preview creator 410 may determine the main screens of the app and may produce a preview version of the app based on the main app screens The designer may preview the generated preview version and modify the app for which the preview version was created. Once the designer is satisfied with the resultant app he may request the system to publish it using ASSM 1540 that may provide support to the user in the ADP submission process. The app may be submitted to ADP 170 and may be downloaded and installed by end users on their mobile device.

The website designer may continuously update the website and the information stored in UDB 120 and may update the content of the website stored in ODB 125. In addition the app designer may update the app through app editor UI 1510 connected to app editor 350. It should be noted that the basic app generation process, up to the preview/ADP submission stage, may be undertaken based on a single user click (assuming no special customizations are performed).

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
   at least one processor; and
   an application generating website building system (AGWBS) running on said at least one processor for converting a website to an application (app) which operates on a mobile device, said AGWBS comprising:
   a WBS server to enable a designer to create and edit said website;
   an application generator to analyze structure and content of said created website and to retrieve from at least one database, a layout option-for said app according to at least said analysis and stored BI (business intelligence) for said website, wherein said BI includes at least use of settings and features by said designer from previous editing sessions of said website and other websites and apps created with said AGWBS;
   said application generator to further generate an initial extended application content file (XACF) for said layout option accordingly;
   an app-editor to determine an editor mode for said designer according to at least said BI and to display said layout option according to said editor mode and to receive modifications to said layout from said designer; and an app generator to generate said app according to said layout, said XACF and said modifications.

2. The system according to claim 1 wherein said BI further comprises at least one of: editing session length, number of saves and designer preferences and interests.

3. The system according to claim 1 wherein said editing made is one of: simple, intermediate, and advanced.

4. The system according to claim 1 wherein said app-editor comprises and app-editor UI to display said layout option on a screen and to navigate between said screen and a second screen for said app.

5. The system according to claim 1 wherein said app-editor operates on absolute layouts, relative layouts, responsive layouts, or a combination thereof.

6. The system according to claim 1 wherein said app-editor employs a classification system using machine learning technologies for said BI and assigns a combined complexity and customizability score (CCC) to said layout option to indicate complexity of editing accordingly.

7. The system according to claim 2 wherein said app-editor tags said layout option to said designer preferences and interests.

8. The system according to claim 6 wherein said CCC score is based on at least a number of configurable properties of said layout option.

9. The system according to claim 1 and wherein said layout option-is at least one of: designed by staff of said AGWBS, imported from a source external to said AGWBS, extracted from existing layouts from said AGWBS, acquired from a layout marketplace and automatically generated.

10. A method for an application generating website building system (AGWBS), said method comprising:

converting a website to an application (app) which operates on a mobile device, said converting comprising:

enabling a designer to create and edit said website;

analyzing structure and content of said created website and retrieving from at least one database, a layout option for said app according to at least said analyzing and BI (business intelligence) for said website, wherein said BI includes at least use of settings and features by said designer from previous editing sessions of said website and other websites and apps created with said AGWBS generating an initial extended application content file (XACF) for said layout option according to said analyzing;

determining an editor mode for said designer according to at least said use of settings and features;

displaying said layout option according to said editor mode;

receiving modifications to said layout from said designer; and generating said app according to said layout, said XACF and said modifications.

11. The method according to claim 10 wherein said BI further comprises at least one of: editing session length, number of saves and designer preferences and interests.

12. The method according to claim 10 wherein said editor mode is one of: simple, intermediate, and advanced.

13. The system according to claim 10 wherein said determining an editor mode comprises displaying said layout option on a screen and navigating between said screen and a second screen for said app.

14. The method according to claim 10 wherein said determining an editor mode operates on absolute layouts, relative layouts, responsive layouts, or a combination thereof.

15. The method according to claim 10 wherein said determining an editor mode employs a classification system using machine learning technologies for said BI and assigns a combined complexity and customizability score (CCC) to said layout option-to indicate complexity of editing accordingly.

16. The method according to claim 11 wherein said determining an editing mode tags said at layout option- according to said designer preferences and interests.

17. The method according to claim 15 wherein said CCC score is based on at least a number of configurable properties of said layout option.

18. The method according to claim 10 and wherein said layout option-is at least one of: designed by staff of said AGWBS, imported from a source external to said AGWBS, extracted from existing layouts from said AGWBS, acquired from a layout marketplace and automatically generated.

* * * * *